United States Patent
Côté et al.

(10) Patent No.: US 11,637,742 B2
(45) Date of Patent: Apr. 25, 2023

(54) ACTION RECOMMENDATION ENGINE (ARE) FOR NETWORK OPERATIONS CENTER (NOC) SOLELY FROM RAW UN-LABELED DATA

(71) Applicant: Ciena Corporation, Hanover, MD (US)

(72) Inventors: David Côté, Gatineau (CA); Shervin Shirmohammadi, Ottawa (CA); Shady A. Mohammed, Nepean (CA); Sa'di Altamimi, Nepean (CA); Basel Altamimi, Nepean (CA)

(73) Assignee: Ciena Corporation, Hanover, MD (US)

( * ) Notice: Subject to any disclaimer, the term of this patent is extended or adjusted under 35 U.S.C. 154(b) by 118 days.

(21) Appl. No.: 17/166,383

(22) Filed: Feb. 3, 2021

(65) Prior Publication Data
US 2022/0247618 A1    Aug. 4, 2022

(51) Int. Cl.
*H04L 41/16* (2022.01)
*H04L 41/0654* (2022.01)
*G06N 20/00* (2019.01)
*H04B 10/03* (2013.01)
*H04L 41/0631* (2022.01)

(52) U.S. Cl.
CPC ......... *H04L 41/0654* (2013.01); *G06N 20/00* (2019.01); *H04B 10/03* (2013.01); *H04L 41/0631* (2013.01)

(58) Field of Classification Search
CPC .......... H04B 10/03; G06F 17/18; G06N 3/02; G06N 3/08; G06N 20/00; H04L 41/0631; H04L 41/0654; H04L 41/145; H04L 41/16; H04L 41/40; H04L 41/5009; H04L 43/028; H04L 2012/5686
See application file for complete search history.

(56) References Cited

U.S. PATENT DOCUMENTS

| | | | |
|---|---|---|---|
| 9,197,565 B2 | 11/2015 | Khanchi et al. |
| 9,924,392 B2 | 3/2018 | Côté et al. |
| 10,050,868 B2 | 8/2018 | Porras et al. |
| 10,171,161 B1 | 1/2019 | Côté et al. |
| 10,623,277 B2 | 4/2020 | Djukic et al. |
| 10,841,181 B2 | 11/2020 | Côté et al. |
| 11,102,238 B2 | 8/2021 | Ackerman et al. |
| 2002/0188936 A1 | 12/2002 | Bojanic et al. |
| 2014/0092204 A1 | 4/2014 | Javadtalab et al. |

(Continued)

OTHER PUBLICATIONS

Altamimi, Towards Superintelligence-Driven Autonomous Network Operation Centers Using Reinforcement Learning, Thesis, University of Ottawa, 66 pages, 2021.*
Mohammed, Artificial Intelligence in Computer Networks: Delay Estimation, Fault Detection, and Network Automation, Thesis, University of Ottawa, 95 pages, 2021.*

(Continued)

*Primary Examiner* — Frank Duong
(74) *Attorney, Agent, or Firm* — Baratta Law PLLC; Lawrence A. Baratta, Jr.

(57) ABSTRACT

Systems, methods, and computer-readable media are provided for recommending actions to be taken in a network for optimizing or improving the operability of the network. A method, according to one implementation, includes a first step of receiving raw, unprocessed data that is obtained directly from one or more network elements of a network. The method includes second step of determining one or more remedial actions using a direct association between the raw, unprocessed data and the one or more remedial actions.

20 Claims, 12 Drawing Sheets

(56) References Cited

U.S. PATENT DOCUMENTS

| | | | |
|---|---|---|---|
| 2017/0063599 A1* | 3/2017 | Wu | H04L 43/091 |
| 2018/0034922 A1* | 2/2018 | Gopalan | H04L 41/00 |
| 2018/0248905 A1 | 8/2018 | Côté et al. | |
| 2019/0138948 A1 | 5/2019 | Janulewicz et al. | |
| 2019/0280942 A1 | 9/2019 | Côté et al. | |
| 2019/0303726 A1 | 10/2019 | Côté et al. | |
| 2019/0349287 A1* | 11/2019 | Chandra Sekar Rao | H04L 45/08 |
| 2020/0082013 A1 | 3/2020 | Triplet et al. | |
| 2020/0259700 A1 | 8/2020 | Bhalla et al. | |
| 2020/0259717 A1 | 8/2020 | Ong et al. | |
| 2020/0287788 A1 | 9/2020 | Triplet et al. | |
| 2021/0385135 A1* | 12/2021 | Côté | G06F 17/18 |

OTHER PUBLICATIONS

Cote et al., A Machine-Learning-Based Action Recommender for Network Operation Centers, IEEE, Sep. 2021.*

Gin et al., NeoRL: A Near Real-World Benchmark for Offline Reinforcement Learning, arXiv, 29 pages, Feb. 8, 2021.*

Mohammed et al., Machine Learning and Deep Learning Based Traffic Classification and Prediction in Software Defined Networking, IEEE, 6 pages, 2019.*

Blum et al., Network Operations Centers, Lucent Technologies, 20 pages, Jan. 22, 2001.*

Gu et al., "Machine Learning for Intelligent Optical Networks: A Comprehensive Survey", Beijing Laboratory of Advanced Information Network, Beijing University of Posts and Telecommunications (BUPT), arXiv:2003.05290v1 [cs.NI], Apr. 2, 2020, pp. 1-42.

* cited by examiner

|           | DoNoth | Fix LR-1-3 | Fix LR-2-4 | Fix LR-2-1 | TE-P1 -> P2 | Fix LR-3-2 | TE-P3 -> P2 | Fix LR-3-5 | TE-P1 -> P3 | TE-P2 -> P3 | TE-P2 -> P1 | TE-P3 -> P1 |
|---|---|---|---|---|---|---|---|---|---|---|---|---|
| DoNoth      | 1.0  | 0.0 | 0.0  | 0.0 | 0.0  | 0.0 | 0.0 | 0.0  | 0.0  | 0.0  | 0.0 | 0.0  |
| Fix LR-1-3  | 0.0  | 1.0 | 0.0  | 0.0 | 0.0  | 0.0 | 0.0 | 0.0  | 0.0  | 0.0  | 0.0 | 0.0  |
| Fix LR-2-4  | 0.01 | 0.0 | 0.99 | 0.0 | 0.0  | 0.0 | 0.0 | 0.0  | 0.0  | 0.0  | 0.0 | 0.0  |
| Fix LR-2-1  | 0.0  | 0.0 | 0.0  | 1.0 | 0.0  | 0.0 | 0.0 | 0.0  | 0.0  | 0.0  | 0.0 | 0.0  |
| TE-P1 -> P2 | 0.06 | 0.0 | 0.0  | 0.0 | 0.94 | 0.0 | 0.0 | 0.0  | 0.0  | 0.0  | 0.0 | 0.0  |
| Fix LR-3-2  | 0.0  | 0.0 | 0.0  | 0.0 | 0.0  | 1.0 | 0.0 | 0.0  | 0.0  | 0.0  | 0.0 | 0.0  |
| TE-P3 -> P2 | 0.0  | 0.0 | 0.0  | 0.0 | 0.0  | 0.0 | 1.0 | 0.0  | 0.0  | 0.0  | 0.0 | 0.0  |
| Fix LR-3-5  | 0.01 | 0.0 | 0.0  | 0.0 | 0.0  | 0.0 | 0.0 | 0.99 | 0.0  | 0.0  | 0.0 | 0.0  |
| TE-P1 -> P3 | 0.07 | 0.0 | 0.0  | 0.0 | 0.0  | 0.0 | 0.0 | 0.0  | 0.93 | 0.0  | 0.0 | 0.0  |
| TE-P2 -> P3 | 0.03 | 0.0 | 0.0  | 0.0 | 0.0  | 0.0 | 0.0 | 0.0  | 0.0  | 0.97 | 0.0 | 0.0  |
| TE-P2 -> P1 | 0.0  | 0.0 | 0.0  | 0.0 | 0.0  | 0.0 | 0.0 | 0.0  | 0.0  | 0.0  | 1.0 | 0.0  |
| TE-P3 -> P1 | 0.08 | 0.0 | 0.0  | 0.0 | 0.0  | 0.0 | 0.0 | 0.0  | 0.0  | 0.0  | 0.0 | 0.92 |

| V-Net | Pi-Net | Gain |
|---|---|---|
| 256, 128, 18 | 128, 64, 64 | 4778144 |
| 256 | 64 | 4290899 |
| 256 | 64, 64 | 4326903 |
| 256 | 64, 64, 64 | 4370411 |
| 256 | 128 | 4329988 |
| 256, 128 | 64 | 4992534 |
| 256, 128 | 64, 64 | 4311737 |
| 256, 128 | 128, 64 | 4300530 |
| Expert (NOC) | - | 3792901 |
| 256, 128, 18 | 128 | 5047411 |

ACTION RECOMMENDATION ENGINE (ARE) FOR NETWORK OPERATIONS CENTER (NOC) SOLELY FROM RAW UN-LABELED DATA

TECHNICAL FIELD

The present disclosure generally relates to networking systems and methods. More particularly, the present disclosure relates to utilizing an Action Recommendation Engine (ARE) in a Network Operations Center (NOC).

BACKGROUND

Current software products are unable to adequately provide useful guidance or recommendations about how, when, and where actions are taken on a network. However, some professional services are able to provide some partial compensation in this regard.

Across the industry, closed-loop automation software in use today is generally based on expert rules. This approach can work for relatively simple cases if programmers have domain expertise. However, determining effective rules for more complex scenarios can become incrementally difficult. Also, many software products do not work for multi-vendor or multi-domain scenarios since codifying collective domain expertise into explicit rules can get incrementally difficult and expensive.

In some scenarios, an Action Recommendation Engine (ARE) may be used by taking explicit network states as an input to supervised Machine Learning (ML). The states of the network or states of the network elements may be provided as training and testing data sets. This data in this respect may come from external labeling.

A services team (e.g., a Network Operations Center (NOC)) may generally be able to provide effective guidance about how, when, and where to act on a network, but at the expense of lots of time and resources. Also, this process may be tedious and expensive. Furthermore, expert rules do not work well for complex scenarios where determining good rules gets incrementally difficult. Also, expert rules do not work for multi-vendor or multi-domain scenarios where codifying collective domain expertise into explicit rules gets incrementally difficult and expensive. First, an ARE version may require the network state as input. Determining the network state can be difficult or expensive, or the state may be ill-defined, which was a weakness of the earlier ARE. Therefore, there is a need in the field of NOCs or the like to provide AREs that can overcome some of the issues of previous solutions.

BRIEF SUMMARY

The present disclosure is directed to various systems, methods, and computer-readable media configured to utilize an Action Recommendation Engine (ARE) to recommend actions to be taken in a network. According to one implementation, a system includes a processing device and a memory device configured to store computer logic having instructions. The instruction, when executed, are configured to enable the processing device to receive raw, unprocessed data obtained directly from one or more network elements of a network and determine one or more remedial actions using a direct association between the raw, unprocessed data and the one or more remedial actions.

According to another implementation, a non-transitory computer-readable medium is configured to store computer logic having instructions that, when executed, cause one or more processing devices to receive raw, unprocessed data obtained directly from one or more network elements of a network. The instructions further cause the one or more processing devices to determine one or more remedial actions using a direct association between the raw, unprocessed data and the one or more remedial actions.

According to yet another implementation, a method may include the steps of receiving raw, unprocessed data obtained directly from one or more network elements of a network and determining one or more remedial actions using a direct association between the raw, unprocessed data and the one or more remedial actions.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 14 is a table showing a confusion matrix for a fully-connected Neural Network (NN), according to various embodiments.

DETAILED DESCRIPTION

Figure 1:
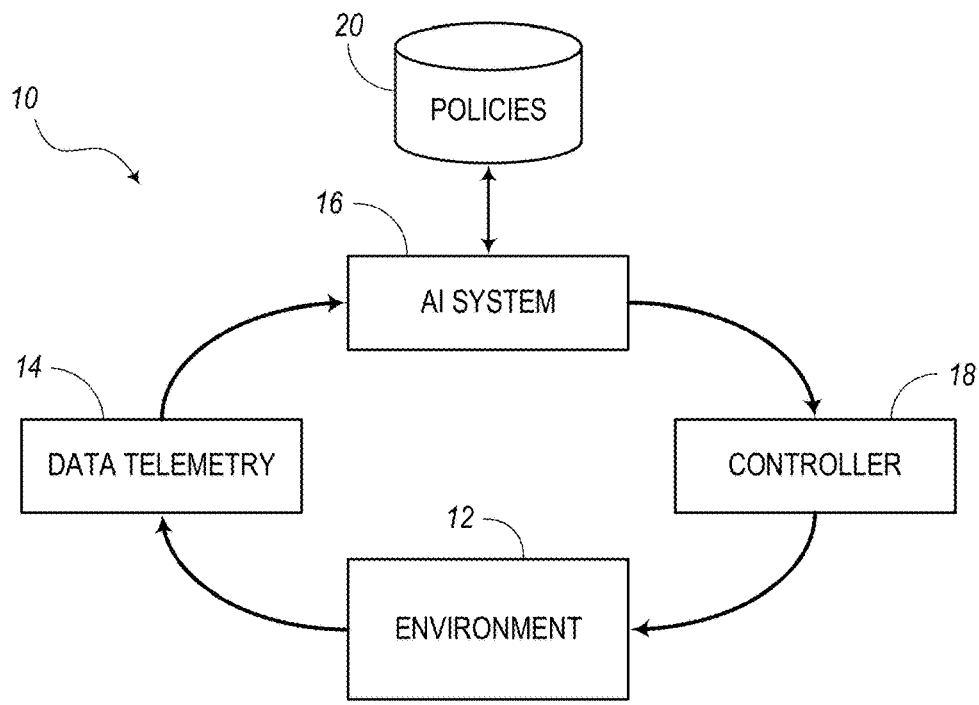
FIG. 1 is a block diagram of a feedback loop driven by Artificial Intelligence (AI) for adaptive control of an environment, according to various embodiments.

FIG. 1 is a block diagram of a feedback loop 10 driven by Artificial Intelligence (AI) for adaptive control of an environment 12 (e.g., a network or other suitable type of executable system). The environment 12 may include multiple components or sub-systems (e.g., network elements), which can be physical and/or virtual components. The AI-driven feedback loop 10 may include an AI system 16, which can receive data telemetry 14 from the environment 12. Based on predetermined policies 20, the AI system 16 can process the data telemetry 14 using data-driven training and inference models and then provide results to a controller 18 or orchestrator for control of the environment 12.

The controller 18 is configured to modify/update the components or sub-systems (e.g., network elements) of the environment 12 based on the feedback from the AI system 16. The AI system 16 can be a server, network controller, SDN application, cloud-based application, etc. The AI system 16 may include one or more processing device which receive inputs (e.g., data telemetry 14) and provides outputs to the controller 18 for automated control of the environment 12. The AI system 16 can also be referred to as an ML inference engine.

Various techniques for AI control, ML, etc., are contemplated. Some examples are described in commonly-assigned U.S. patent application Ser. No. 16/185,471, filed Nov. 9, 2018, and entitled "Reinforcement learning for autonomous telecommunications networks," U.S. Pat. No. 10,171,161, issued Jan. 1, 2019, and entitled "Machine learning for link parameter identification in an optical communications system," U.S. patent application Ser. No. 16/251,394, filed Jan. 18, 2019, and entitled "Autonomic resource partitions for adaptive networks," and U.S. patent application Ser. No. 15/896,380, filed Feb. 14, 2018, and entitled "Systems and methods to detect abnormal behavior in networks," the contents of each are incorporated by reference herein.

The AI-driven feedback loop 10 can play an instrumental role in adaptive network systems. Such systems need response time (i.e., time to compute the probability of an outcome given input data) to be fast for identifying an optimal action to take in order to change network/service state. This can be a complex decision that needs to consider input data patterns, network/service states, policies 20, etc.

Generally, two broad types of AI can be used to drive "closed loops" by the AI system 16, namely 1) supervised or unsupervised pattern-recognition algorithms used to understand what is happening in the environment 12 (e.g., see U.S. patent application Ser. No. 15/896,380 noted herein), and 2) reinforcement learning used to decide what actions should be taken on the environment 12 (see U.S. patent application Ser. No. 16/185,471 noted herein).

Figure 2:
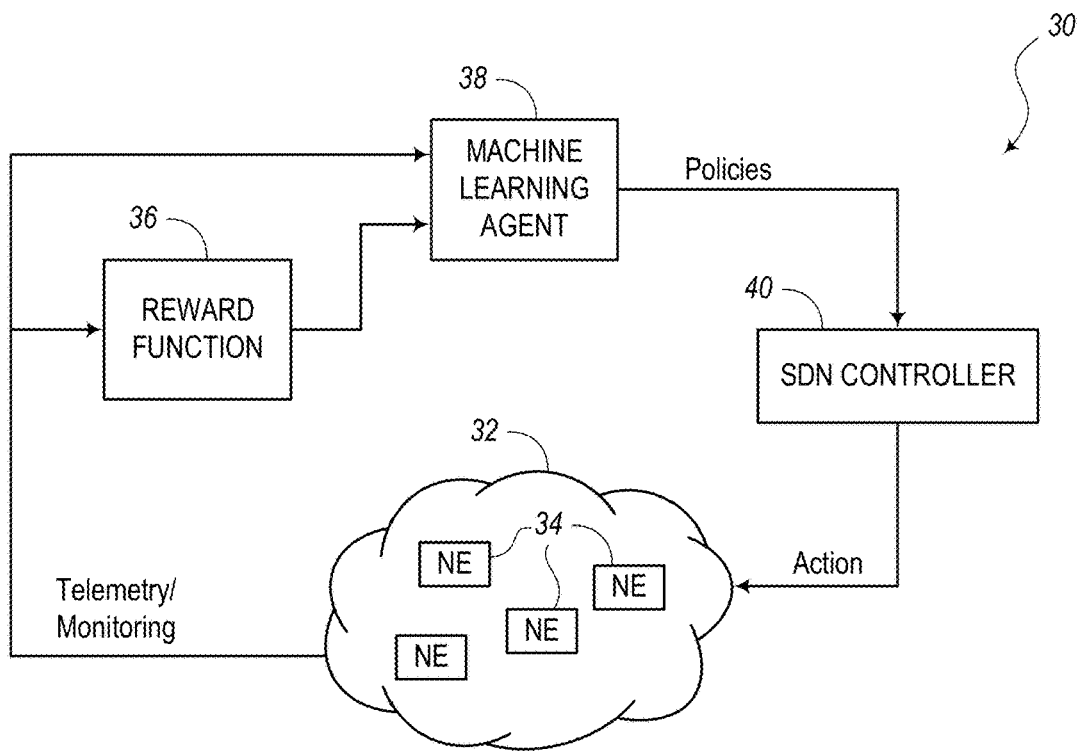
FIG. 2 is a block diagram of a Reinforcement Learning (RL) system, according to various embodiments.

FIG. 2 is a block diagram of a Reinforcement Learning (RL) system 30. Reinforcement Learning can be used for closed-loop applications where there may not be a need for human supervision and the AI system 16 can independently derive state information from an executable system or other controllable environment, and then decide on actions to affect that environment, e.g., a service or resource instance in a given network domain. In FIG. 2, the RL system 30 is arranged to control an executable system or environment, which, in this implementation, is configured as a network 32 (e.g., a network).

In the network environment, the network 32 may include a number of Network Elements (NEs) 34 (or other components or sub-systems). The NEs 34 may include physical and/or virtual elements. The physical network elements can include switches, routers, cross-connects, add-drop multiplexers, and the like. The virtual network elements can include Virtual Network Functions (VNFs) which can include virtual implementations of the physical network elements. The network 32 can include one or more layers including optical (Layer 0), TDM (Layer 1), packet (Layer 2), etc. In one embodiment, the NEs 34 can be nodal devices that may consolidate the functionality of a multi-service provisioning platform (MSPP), digital cross-connect (DCS), Ethernet and Optical Transport Network (OTN) switch, DWDM platform, etc. into a single, high-capacity intelligent switching system providing Layer 0, 1, 2, and/or 3 consolidation. In another embodiment, the NEs 34 can be any of an Add/Drop Multiplexer (ADM), a multi-service provisioning platform (MSPP), a digital cross-connect (DCS), an optical cross-connect, an optical switch, a router, a switch, a Wavelength Division Multiplexing (WDM) terminal, an access/aggregation device, etc. That is, the NEs 34 can be any system with ingress and egress signals and switching of packets, channels, timeslots, tributary units, wavelengths, etc. The network 32 can be viewed as having a data plane where network traffic operates and a control plane (or management plane) where control of the data plane is performed. The control plane provides data telemetry 14 during operation. The data telemetry 14 can include, without limitation, Operations, Administration, Maintenance, and Provisioning (OAM&P) data, Performance Monitoring (PM) data, alarms, and the like.

The network 32 provides telemetry and monitoring data to a reward function 36 and to an ML agent 38. The reward function 36 also provides an input to the ML agent 38. The ML agent 38 can be configured as the AI system 16 shown in FIG. 1, according to some embodiments, and may provide an interpreter function observing the network 32 via the telemetry and monitoring data for current state information and determining the actions required to achieve a target state. The reward function 36 is used by the ML agent 38 to maximize the probability, and thus reinforcing behavior, of achieving the target state.

Typically, the RL system 30 is initially trained on a large data set in order to give it a base set of operational policies for business/service/network target states to invoke or maintain based on the state of the network 32, then an inference model of the RL system 30 may continue to learn and refine its behavior as it is exposed to the real-world behaviors and may observe the results of its actions there. In some cases, the RL system 30 may need to experiment with an available set of possible actions constrained by operational policies while attempting to find the optimal action. In some cases, the operational policies themselves could be refined, i.e., dynamic policy, based on observed current state as well as actions taken in previous attempts.

In some embodiments, the RL system 30 may be configured to define costs and rewards to quantify network actions, determine allowed network actions, and define metrics describing a state of the network 32. The RL system 30 may obtain network data to determine a current state of the network 32 based on the defined metrics and determine one or more of the network actions based on the current state and based on minimizing the costs and/or maximizing the rewards. That is, RL includes rewards/costs which set an objective or goal. A state may be defined according to where the network 32 is relative to the objective/goal and what network actions may be performed to drive the state towards the objective/goal.

Other types of Machine Learning (ML) can be used to drive closed-loop network applications, notably: pattern-recognition and event-classification techniques such as Artificial Neural Networks (ANN) and others. In this case, a set of raw inputs from the telemetry and monitoring data can be turned into a higher-level insight about the network state, which in turn can be used to decide how to take actions to modify the network 32. For example, collections of performance monitoring data can be interpreted by an AI as: "there seems to be a congestion happening on link X affecting services ABC," "bandwidth allocated to service D should become under-utilized for the next 8 hours and could be used elsewhere," "behavior of device Y suggests a high risk of failure within next 2-3 days," etc. As a result, network policies could take automated actions such as re-route low-priority away from link X, re-allocate some of the service D bandwidth to other services EFG or re-route services away from device Y and open a maintenance ticket.

Action Recommendation Systems

Figure 3:
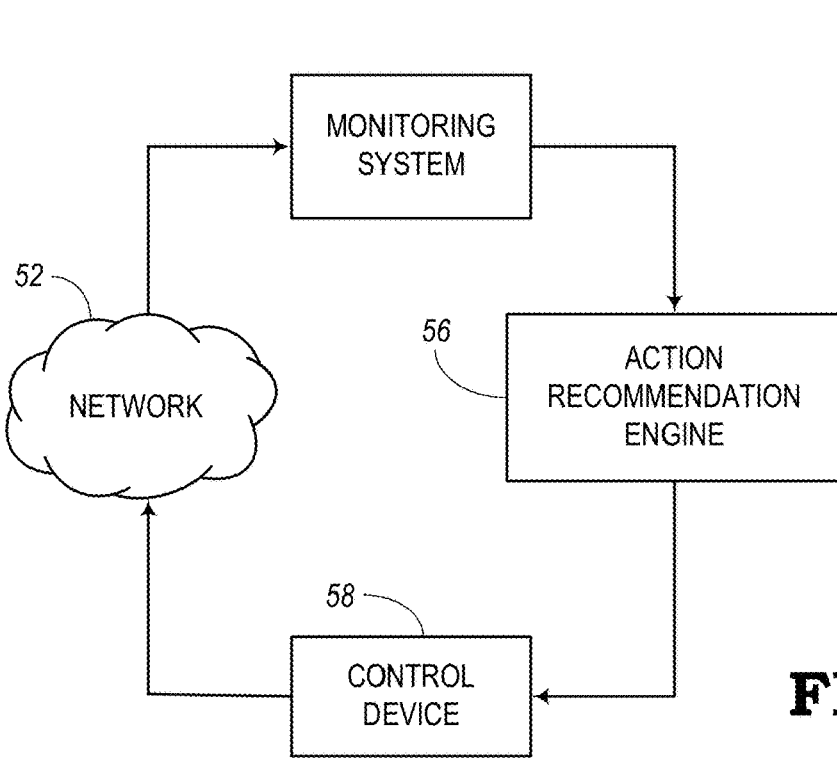
FIG. 3 is a block diagram illustrating a closed-loop system for providing adaptive control of a network, according to various embodiments.

FIG. 3 is a block diagram illustrating another embodiment of a closed-loop system 50 for providing adaptive control of a network 52. A monitoring system 54 may be used to obtain historical input data from the network 52. The input data may include metrics, parameters, characteristics, etc., measured or obtained in any suitable manner from network elements of the network 52. In addition to statistic-type data, the monitoring system 54 is also configured to obtain information about various actions that have taken place in the network 52. The data and information obtained by the monitoring system 54 is provided to an Action Recommendation Engine (ARE) 56, which includes AI-based processing to utilize the data/information for training a model. Once trained, the model of the ARE 56 may be utilized for providing control instructions to a control device 58. In this way, when newly obtained metric data and action information is provided to the ARE 56, the ARE 56 can utilize the AI model to instruct the control device 58 to perform certain functions. For example, the control device 58 may be configured to perform certain recommended actions on the network 52 or to simply provide a recommendation of actions that may be taken by a network operator responsible for enacting changes to the network 52.

More particularly, the monitoring system 54 may be configured to obtain input data (e.g., telemetry data) regarding measurements of various parameters or metrics of the network 52. In addition, the monitoring system 54 may be configured to detect historical actions that have been applied to the network 52.

According to some embodiments, the ARE 56 may be configured to perform various machine learning processes and may also assist to control processes for training and utilizing a ML model, as needed. The ARE 56 may be configured to train (and re-train, as needed) a ML model based on the historical data and actions imposed on the network 52. Once a ML model is trained, the ARE 56 may be configured to use the trained ML model to process new parameters obtained from the network 52 and new actions imposed on the network 52 to perform remediation actions, instructional actions, and/or detection actions.

The ARE 56 may be implemented with supervised ML. Equipped with input data from the monitoring system 54, the ARE 56 can be implemented as a (multi-class) classifier trained with a supervised ML approach. In this framework, the time-series of alarms and KPIs are the features characterizing the different possible states of network elements, while the actions are the labels that are to be learned. For example, labels may be "normal," "router issue," "congestion," "high traffic," etc.

The present disclosure therefore describes a closed-loop system 50 having an Action Recommendation Engine (ARE) 56 that is based on Machine Learning (ML) to support closed-loop applications for networks. Once input is received by the monitoring system 54, there may be two different approaches to implementing the ARE 56, where one approach may be based on supervised ML, and another approach may be based on Collaborative Filtering. The ARE 56 can then be used to provide some results that can improve the state of the network 52 or provide various benefits for solving or improving network issues, such as, among others: 1) recommending a closed-loop action, and 2) identifying one or more root-causes of network issues.

Again, the monitoring system 54 is configured to receive input data. To be used "live" (inference), the inputs to the ARE 56 are the same as some network assurance applications. The inputs may include alarms, Key Performance Indicators (KPIs) of the network elements, traffic and services flow information, Quality of Service (QoS) information, Quality of Experience (QoE) information, etc. However, for the training component 66 of the ARE 56 to train ML models, the ARE 56 relies on an input that is not normally utilized. In particular, the new input that is uses is information regarding a plurality of actions performed on the network 52. For instance, some of the actions may include:

DOC Action: Channel Add in Progress, MRS-R00, Shelf:1 Slot:1, 2020-03-24 21:49:52

DOC Action: Channel Delete in Progress, MRS-R00, Shelf:1 Slot:1, 2020-03-24 22:53:22

Software Auto-Upgrade in Progress—MOTR, WAT-R002, Shelf:5 Slot:13, 2020-03-24 23:49:52

Protection Switch Complete—Revertive—OTM0 Shelf:1 Slot:5 Port:6, 2020-03-25 08:25:58

The events, network operations, or other information regarding network actions can be collected from sources such as Network Management Systems (NMSs), ticketing systems, Network Configuration and Change Management (NCCM) systems, etc. One goal may be to collect as much data as comprehensively as possible in order to derive the best precision and recall from ML algorithms.

Figure 4:
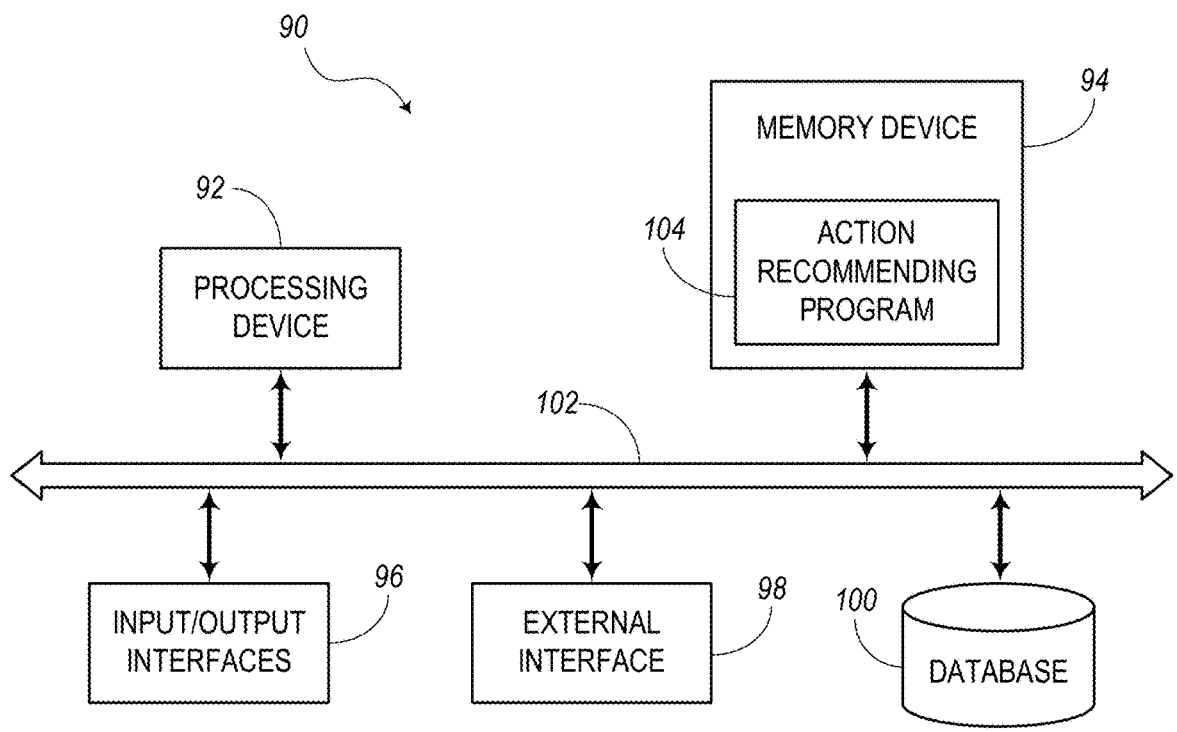
FIG. 4 is a block diagram illustrating a Network Operations Center (NOC) for providing closed-loop or feedback control to a network, according to various embodiments.
Figure 7:
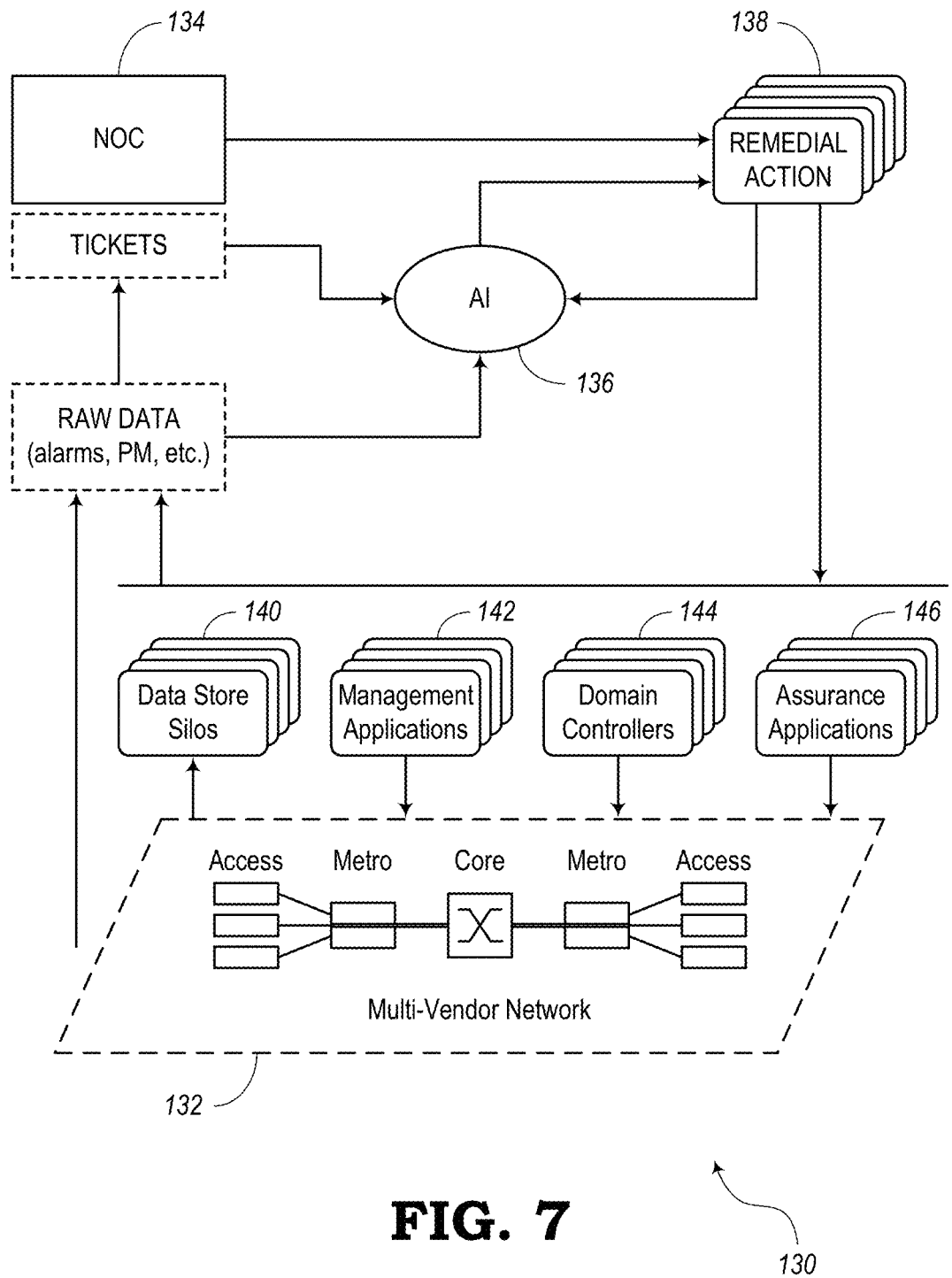
FIG. 7 is a diagram illustrating another ARE system, according to various embodiments.

FIG. 4 is a block diagram illustrating another embodiment of a Network Operations Center (NOC) 90 or other suitable controller, which may be used for providing closed-loop or feedback control to a network (or other executable system or environment). In the illustrated embodiment, the NOC 90 may be a digital computer that, in terms of hardware architecture, generally includes a processing device 92, a memory device 94, Input/Output (I/O) interfaces 96, an external interface 98, and a database 100. The memory device 94 may include a data store, database (e.g., database 100), or the like. It should be appreciated by those of ordinary skill in the art that FIG. 7 depicts the NOC 90 in a simplified manner, where practical embodiments may include additional components and suitably configured processing logic to support known or conventional operating features that are not described in detail herein. The components (i.e., 92, 94, 96, 98, 100) are communicatively coupled via a local interface 102. The local interface 102 may be, for example, but not limited to, one or more buses or other wired or wireless connections. The local interface 102 may have additional elements, which are omitted for simplicity, such as controllers, buffers, caches, drivers, repeaters, receivers, among other elements, to enable communications. Further, the local interface 102 may include address, control, and/or data connections to enable appropriate communications among the components 92, 94, 96, 98, 100.

The processing device 92 is a hardware device adapted for at least executing software instructions. The processing device 92 may be any custom made or commercially available processor, a Central Processing Unit (CPU), an auxiliary processor among several processors associated with the NOC 90, a semiconductor-based microprocessor (in the form of a microchip or chip set), or generally any device for executing software instructions. When the NOC 90 is in operation, the processing device 92 may be configured to execute software stored within the memory device 94, to communicate data to and from the memory device 94, and to generally control operations of the NOC 90 pursuant to the software instructions.

It will be appreciated that some embodiments of the processing device 92 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 92 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 96 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 96 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The external interface 98 may be used to enable the NOC 90 to communicate over a network, such as the network 32, 52, the Internet, a Wide Area Network (WAN), a Local Area Network (LAN), and the like. The external interface 98 may include, for example, an Ethernet card or adapter (e.g., 10 BaseT, Fast Ethernet, Gigabit Ethernet, 10 GbE) or a Wireless LAN (WLAN) card or adapter (e.g., 802.11a/b/g/n/ac).

The external interface 98 may include address, control, and/or data connections to enable appropriate communications on the network 32, 52.

The memory device 94 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 94 may incorporate electronic, magnetic, optical, and/or other types of storage media. The memory device 94 may have a distributed architecture, where various components are situated remotely from one another, but can be accessed by the processing device 92. The software in memory device 94 may include one or more software programs, each of which may include an ordered listing of executable instructions for implementing logical functions. The software in the memory device 94 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 94 may include a data store used to store data. In one example, the data store may be located internal to the NOC 90 and may include, for example, an internal hard drive connected to the local interface 102 in the NOC 90. Additionally, in another embodiment, the data store may be located external to the NOC 90 and may include, for example, an external hard drive connected to the Input/Output (I/O) interfaces 96 (e.g., SCSI or USB connection). In a further embodiment, the data store may be connected to the NOC 90 through a network and may include, for example, a network attached file server.

Moreover, some embodiments may include a non-transitory computer-readable storage medium having computer readable code stored in the memory device 94 for programming the NOC 90 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 92 that, in response to such execution, cause the processing device 92 to perform a set of operations, steps, methods, processes, algorithms, functions, techniques, etc. as described herein for the various embodiments.

Therefore, according to various embodiments of the present disclosure, the NOC 90 may be configured in a closed-loop system. The NOC 90 comprises the processing device 92 and the memory device 94 configured to store a computer program having logic instructions (e.g., ML module) configured to cause the processing device to execute certain functions. For example, the logic instructions are configured to obtain input data pertaining to a state of a system (or environment 12, network 32, 52, etc.) in the closed-loop system and obtain information regarding one or more historical actions performed on the system. Furthermore, the logic instructions are configured to utilize a ML model for imposing one or more current actions on the system. The one or more current actions selected from the group of procedures consisting of: a) suggesting one or more remediation actions that, when performed, transition the system from a problematic state to a normal state, and b) identifying one or more root causes in response to detecting a transition in the system from a normal state to a problematic state.

Furthermore, the NOC 90 may be configured such that the logic instructions cause the processing device to train the ML model to recommend actions to be taken on the network. Training the ML model may use one or more processes selected from the group of processes consisting of: a) implementing a supervised ML technique, and b) implementing a collaborative filtering technique. In some embodiments, the supervised ML technique may include a classification process for classifying the state of the system and classifying the one or more historical actions performed on the system. The collaborative filtering technique may include the processes of: a) collecting action information regarding the one or more historical actions executed by a plurality of components of the system, b) comparing the action information associated with the plurality of components, and c) ranking and recommending the one or more remediation actions based on comparing the action information.

The input data may be time-series data captured from the network by one of a Network Management System (NMS) and a Network Configuration and Change Management (NCCM) device. The input data may include one or more of alarms, Key Performance Indicators (KPIs), network traffic information, service flow information, Quality of Service (QoS) information, and Quality of Experience (QoE) information. The one or more historical actions may include one or more of a channel addition process, a channel deletion process, a software upgrade, and a protection switch process. The procedure of suggesting one or more remediation actions may include one or more of: a) recommending a plan for re-routing network traffic through an alternative path in the network, b) recommending a change to a Quality of Service (QoS) policy on a port in the network to prioritize network traffic, and c) recommending migrating a payload closer to a source in the network.

Further regarding the NOC 90, the procedure of suggesting one or more remediation actions may include: a) determining a probability parameter associated with each of the one or more remediation actions, b) comparing each probability parameter with a predetermined threshold level, c) providing an output recommending that no action be imposed on the system in response to determining that the probability associated with each remediation action is below the predetermined threshold level, and d) responsive to determining that multiple probabilities exceed the predetermined threshold level, providing an output recommending a selected action of the one or more remediation actions be imposed on the system based on a predefined rule.

Similarly, the action of identifying the one or more root causes may include: a) determining a probability parameter associated with each of the one or more root causes, b) comparing each probability parameter with a predetermined threshold level, c) providing an output indicating that no root cause is likely in response to determining that the probability associated with each root cause is below the predetermined threshold level, and d) responsive to determining that multiple probabilities exceed the predetermined threshold level, providing an output that multiple root causes are likely based on a predefined rule.

The memory device 94 may be configured to store an action recommending program 104 for determining actions to be taken in the network. The action recommending program 104 may be configured with computer logic, instructions, etc. for enabling the processing device 92 to perform one or more procedures related to recommending actions that may be taken. In some embodiments, the action recommending program 104 may be implemented in software and/or firmware. In other embodiments, the action recommending program 104 may be implemented as hardware elements associated with the processing device 92 for performing the action recommendation methods.

When executed, the action recommending program 104, according to some embodiments, may be configured to cause or enable the processing device 92 to receive raw, unprocessed data obtained directly from one or more network elements of a network. Also, the action recommending program 104 may enable the processing device 92 to determine one or more remedial actions using a direct association between the raw, unprocessed data and the one or more remedial actions. These provide a generalized process of the overall intention of the action recommending program 104.

Figure 5:
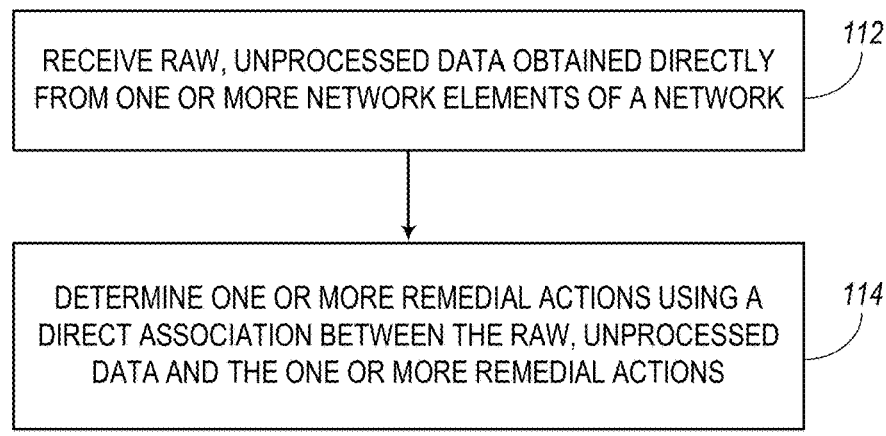
FIG. 5 is a general process of the NOC of FIG. 4, according to various embodiments.

FIG. 5 is a flow diagram illustrating a process 110 for executing action recommendations. For example, the process 110 may be associated with the action recommending program 104 and may be executed by the processing device 92 or other suitable devices. As shown in FIG. 5, the process 110 includes receiving raw, unprocessed data obtained directly from one or more network elements of a network, as indicated in block 112. The process 110 may also include determining one or more remedial actions using a direct association between the raw, unprocessed data and the one or more remedial actions, as indicated in block 114.

According to some embodiments, the process 110 may further be defined, whereby determining the one or more remedial actions is performed without determining a state of the one or more network elements. Determining the one or more remedial actions may include utilizing an ARE (e.g., ARE 56) by a control device (e.g., NOC 90). The process 110 may further include receiving a recommendation from the ARE regarding how, when, and where the one or more remedial actions are to be conducted on the network and leveraging the recommendation to enable manual execution of the one or more remedial actions in the network. Also, the process 110 may include utilizing the ARE to predict actions executed by a NOC based on the raw, unprocessed data.

Furthermore, the process 110 may include utilizing ML to reproduce actions of the NOC in communication with the network. The process 110 may also include obtaining the raw, unprocessed data from historical network data and historical action data from the NOC, pre-training a ML model, and allowing deployment of a Reinforcement Learning (RL) agent that initially uses zero RL exploration to represent NOC effectiveness and gradually, over time, allows RL exploration.

The process 110, in some embodiments, may also include utilizing RL to evaluate the effectiveness of the one or more remedial actions and learn new rules regarding remedial actions. For example, utilizing the RL may include determining a reward based on a difference between Quality of Experience (QoE) and operational expenses. According to various embodiments, the raw, unprocessed data may include Performance Monitoring (PM) data, margin information, alarms, Quality of Service (QoS) information, Quality of Experience (QoE) information, configuration information, fiber cut information, and/or fault information.

The one or more remedial actions may include: a) adjusting launch power at an amplifier, b) adjusting channel power at a Wavelength Selective Switch (WSS), c) adjusting a modulation scheme at an optical receiver, d) rebooting a card, e) cleaning or repairing a fiber, f) utilizing a protection path, g) adding bandwidth, h) defragmenting wavelengths across the network, i) running an Optical Time Domain Reflectometry (OTDR) trace, j) re-provisioning unprotected services after a loss of signal, k) adjusting Open Shortest Path First (OSPF) costs, l) re-routing Internet Protocol (IP) and Multi-Protocol Label Switching (MPLS) tunnels, m) modifying Border Gateway Protocol (BGP) routes, n) re-routing services based on utilization, o) auto-scaling Virtual Network Functions (VNFs), p) adjusting alarm thresholds, q) adjusting timer thresholds, r) clearing upstream alarms, s) fixing inventory, t) upgrading software, and/or any other various actions associated with the networks.

In some embodiments, the process 110 may also include collecting data related to the remedial actions conducted on the network. The data may be related to remedial actions being collected from one or more of shelf processor logs, command logs, a Network Management System (NMS) database, and Network Operations Center (NOC) tickets. The process 110 may also include learning a representation of a network state by observing hidden layers.

According to various embodiments, the network may be modeled in a simulated network environment. The process 110 may then be configured to utilize an RL technique to determine the one or more remedial actions of the simulated network environment and transfer the one or more remedial actions to an actual network. The process 110 can also include training RL agents with initial non-zero exploration in the simulated network environment and transferring pre-trained RL results from the simulated network environment to the actual network.

A high-level concept of AREs has been introduced in related U.S. patent application Ser. No. 16/892,594 (filed Jun. 4, 2020 and entitled "Action Recommendation Engine (ARE) of a closed-loop Machine Learning (ML) system for controlling a network") and is built around the concepts of network states, state transitions, and action classifiers, where Action classifier $C_A(S^x, S^y)=A^{xy}$, and where $A^{xy}$ is the recommended action to go from state "x" ($S^x$) to state "y" ($S^y$). Since determining the network state can be difficult or expensive and the state may not be well-defined, the related application is configured to assume that state information comes from external labeling for SL training and testing data sets. To address state problems, the present disclosure introduces a new version of ARE that can be trained solely from raw data and does not require a process that involves determining the network "state" explicitly. Also, the present disclosure is configured to add new data sources and new application use-cases.

On the other hand, related application U.S. patent application Ser. No. 16/185,471 (filed Nov. 9, 2018 and entitled "Reinforcement learning for autonomous telecommunications networks") is configured for closed-loop applications of Reinforcement Learning (RL) in more general terms. The present disclosure adds concrete data sources, training methods, reward function and application use-cases to this related application. Furthermore, the present disclosure is configured to provide offline RL that can be used to recommend actions in the absence of closed-loop automation.

Figure 6:
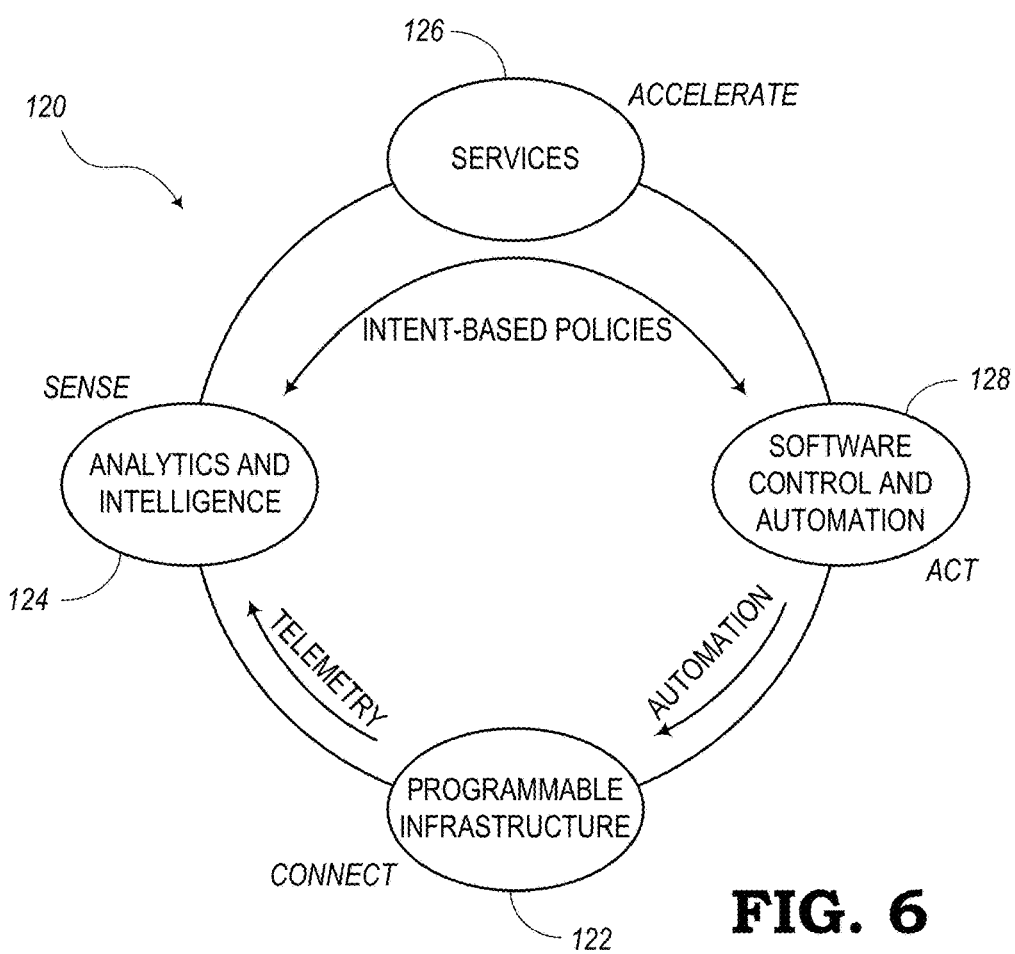
FIG. 6 is a diagram illustrating an Action Recommendation Engine (ARE) system, according to various embodiments.

FIG. 6 is a diagram illustrating an embodiment of an Action Recommendation Engine (ARE) system 120, which may be used to demonstrate the motivation behind the ARE processing in the present disclosure. In this embodiment, the ARE system 120 may be configured with or without closed-loop automation. While software (e.g., action recommending program 104) can act on programmable network infrastructure, the ARE system 120 is configured to provide guidance about where, when, and how to act. In some embodiments, the ARE system 120 may be AI-driven and can provide such guidance for complex situations where explicit "expert rules" are not optimal or not available.

In the embodiment of FIG. 6, the ARE system 120 includes a programmable infrastructure 122 (e.g., network) from which data can be obtained. A connection is made to analytics and intelligence 124, which receives data telemetry that is sensed from the programmable infrastructure 122. Services 126 may include intent-based policies. Software control and automation 128 may be configured with ARE processing logic for providing automation to the programmable infrastructure 122.

FIG. 7 is a diagram illustrating another embodiment of an ARE system 130. In this embodiment, a multi-vendor network 132 having access, metro, and core features is operating. Raw data (e.g., alarms, Performance Metrics (PM), etc.) is obtained from the multi-vendor network 132 and supplied as tickets to a Network Operations Center (NOC) 134. The tickets may also be supplied to an AI device 136. According to various embodiments, the NOC 134 may be configured as a Network Management System (NMS) or other system (e.g., at a data center or a remote facility) where an operator or network manager may be configured to make executive decisions about implementing changes to a network or other infrastructure. In some embodiments, decisions about network changes may be determined using AI processes or other machine-based analysis.

The NOC 134 and AI device 136 may be configured to perform various functions, such as identifying any problems that may exist in the multi-vendor network 132, which may be based on historic or newly acquired raw data and/or tickets. The NOC 134 and AI device 136 may also be configured to isolate various components (e.g., network elements) of the multi-vendor network 132 to diagnose these components. Based solely on the raw data, the NOC 134 and AI device 136 can determine remedial actions 138 to be executed on the multi-vendor network 132. As mentioned above, the process of determining remedial actions 138 can be performed in a unique manner whereby detection of the "state" of the multi-vendor network 132 is bypassed. Therefore, without determining the network state, the raw data can be utilized to directly determine the remedial actions 138.

A database (e.g., database 100) associated with the NOC 134 or AI device 136 may be used for storing the remedial actions 138. Also, the multi-vendor network 132 may be configured to store data in data store silos 140. Management applications 142, domain controllers 144, and assurance applications 146 may be stored in suitable memory and may be applied to the multi-vendor network 132 for management and control and for executing the remedial actions 138 on the multi-vendor network 132.

The arrangement of the ARE system 130 is configured to help the NOC 134 with faster and more effective network assurance. This may be done, for example, by only showing actionable alarms. Also, the ARE system 130 can help the NOC 134 to recommend actions (e.g., remedial actions 138). According to various implementations, the recommended actions may be saved and executed at a later time or may be executed immediately, depending on different circumstances of the multi-vendor network 132.

Actions and Triggers

The ARE system 130 can be trained to recommend a broad set of actions across many different network domains and technologies. For example, actions may be recommended for 1) a network (e.g., optical network). Actions may be recommended for 2) one or more optical channels. Actions may be recommended for 3) an Internet Protocol (IP) network. Actions may be recommended for 4) services or other virtual resources. Actions may even be recommended for 5) network management (e.g., NOC 134). Action can also be recommended for other domains or technologies.

More particularly, recommended actions for 1) an optical network may include: a) rebooting a card (warm or cold), b) cleaning or repairing a fiber, c) protecting a path, d) adding bandwidth, e) defragmenting wavelengths across network, f) putting port in/out of service and running Optical Time-Domain Reflectometry (OTDR) traces, g) re-provisioning un-protected services after a LOS, among others.

Recommended actions for 2) an optical channel may include: a) adjusting launch power at one or more amplifiers, b) adjusting channel power at a WSS, c) adjusting a modulation scheme at an optical receiver, among others.

Recommended actions for 3) IP network may include: a) adjusting Open Shortest Path First (OSPF) costs, b) re-routing Internet Protocol (IP) and Multi-Protocol Label Switching (MPLS) tunnels, c) modifying Border Gateway Protocol (BGP) routes, among others.

Recommended actions for 4) services and other virtual resources may include: a) re-routing services based on utilization, b) auto-scaling Virtual Network Functions (VNFs), among others.

Recommended actions for 5) network management (e.g., NOC, NMS, etc.) may include: a) adjusting alarm thresholds, b) adjusting timer thresholds, c) clearing upstream alarms, d) fixing inventory, e) upgrading software, among others.

Figure 8:
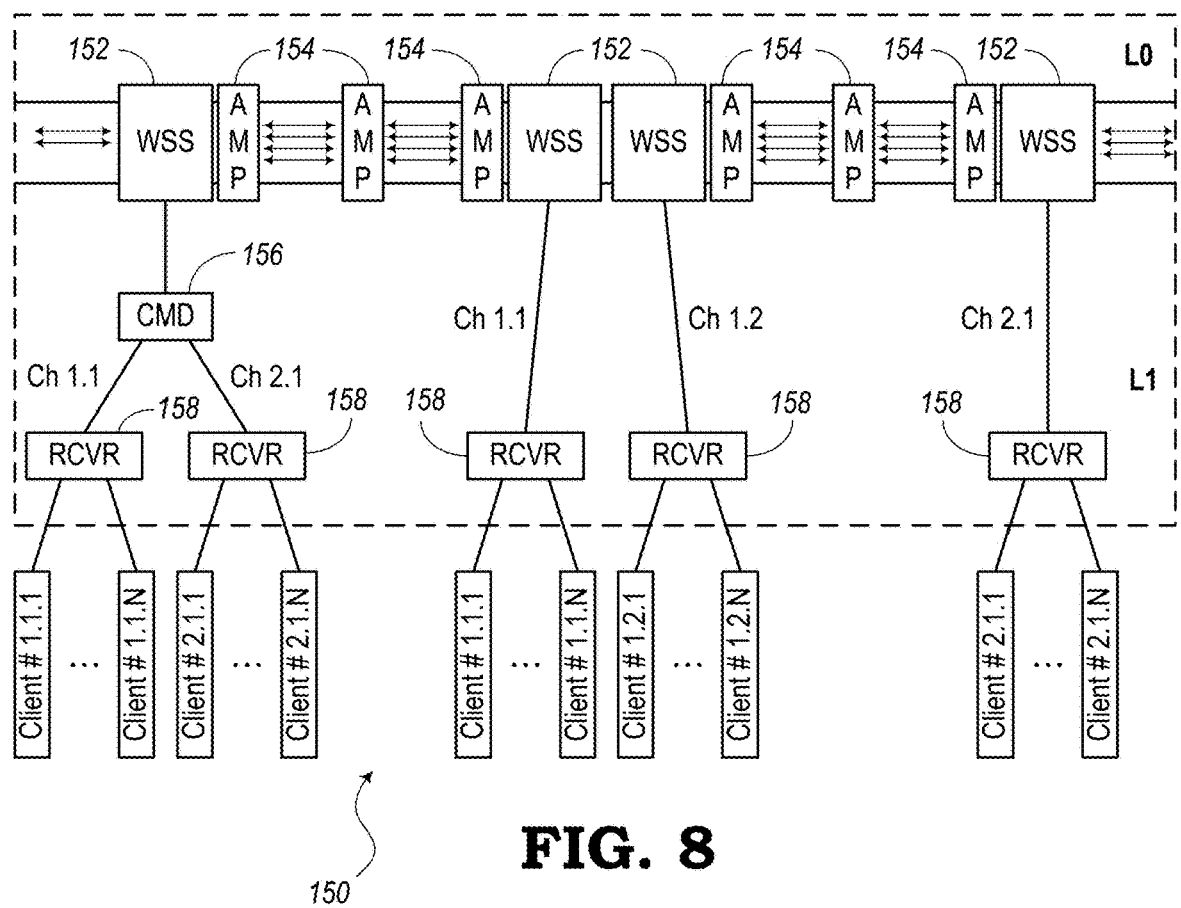
FIG. 8 is a diagram showing a portion of an optical network, according to various embodiments.

FIG. 8 is a diagram showing an embodiment of a portion of an optical network 150. The optical network 150 includes Layer 0 (L0) elements, such as a plurality of Wavelength Selective Switches (WSSs) 152 and a plurality of amplifiers 154. Layer 1 (L1) elements of the optical network 150 may include a Channel Multiplexer/Demultiplexer (CMD) 156 and a plurality of optical receivers 158. A plurality of clients may be connected to each of the optical receivers 158.

Various ARE systems and/or NOCs may be configured to determine recommended actions to be taken in the optical network 150. In some embodiments, the optical network 150 may combine variable bit-rate coherent optics, a flexible grid reconfigurable photonic layer, and Software-Defined Networking (SDN) control to improve visibility, automate processes, and increase network capacity and service availability. The recommended actions in the optical network 150, which may include some of the actions described above, include: a) adjusting launch power at the amplifiers 154, b) adjusting channel power at the WSSs 152, c) adjusting a modulation scheme at the optical receivers 158, d) defragmenting wavelengths across the optical network 150, among others.

There may be several reasons why actions may be recommended for the optical network 150. Some triggers for making action recommendations may include the detection of a) dangerously low margins, b) unnecessarily large margins, c) blocked creation of multi-hops channel, among others.

Figure 9:
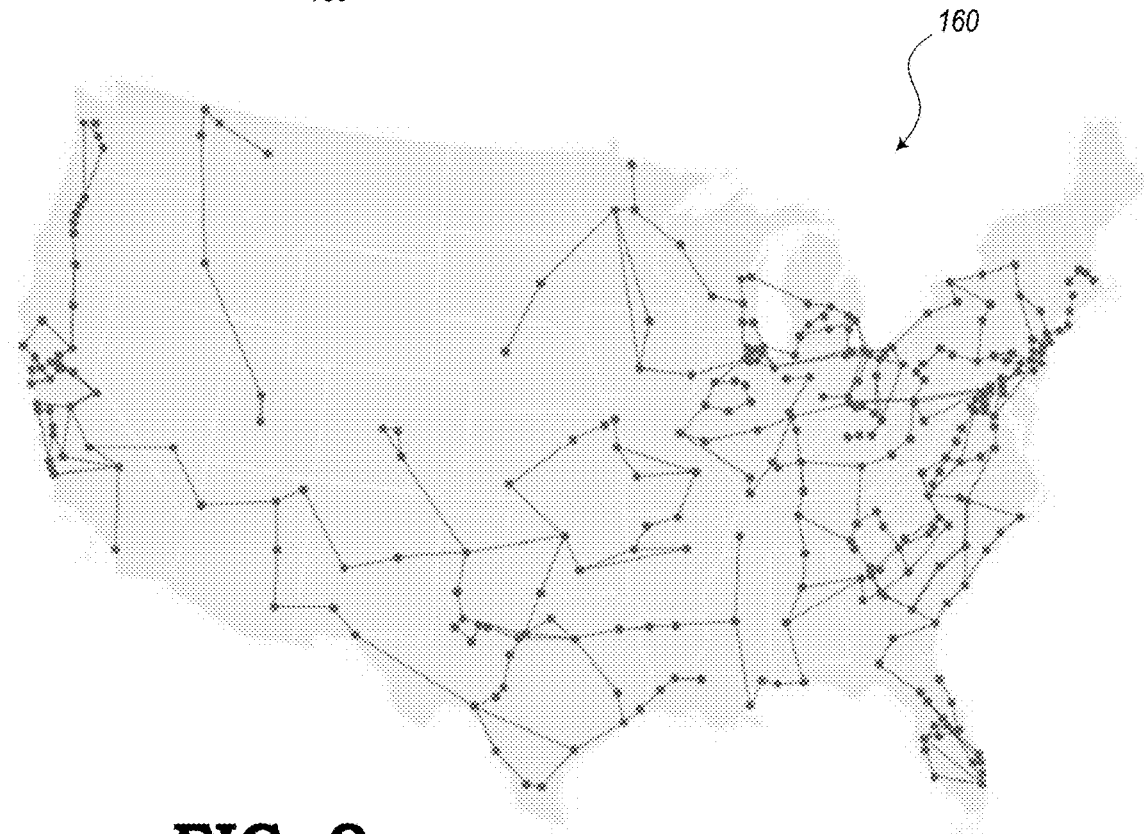
FIG. 9 is a map showing an example of network nodes in a packet/optical network, according to various embodiments.

FIG. 9 is a map showing an example of network nodes in a packet/optical network 160. The ARE systems described in the present disclosure may be configured with software for controlling domains within the packet/optical network 160. The domain controller software may be configured to enable management, control, and/or planning. The ARE systems may be configured to determine a number of different types of actions that may be recommended with respect to the packet/optical network 160. For example, action recommendations in this respect may include a) adjusting alarm threshold, b) adjusting timer thresholds, c) rebooting cards (warm or cold), d) cleaning or repairing fibers, e) establishing protection paths, f) adding bandwidth, g) fixing inventory issues, h) putting ports in service, taking ports out of service, and running OTDR traces, i) clearing upstream alarms, among others.

There may be several reasons why actions may be recommended for the packet/optical network 160. Some triggers for making action recommendations may include the detection of a) misconfiguration of various types, b) fiber cut, c) circuit pack failure, d) signal degrade for various reasons, among others.

Figure 10:
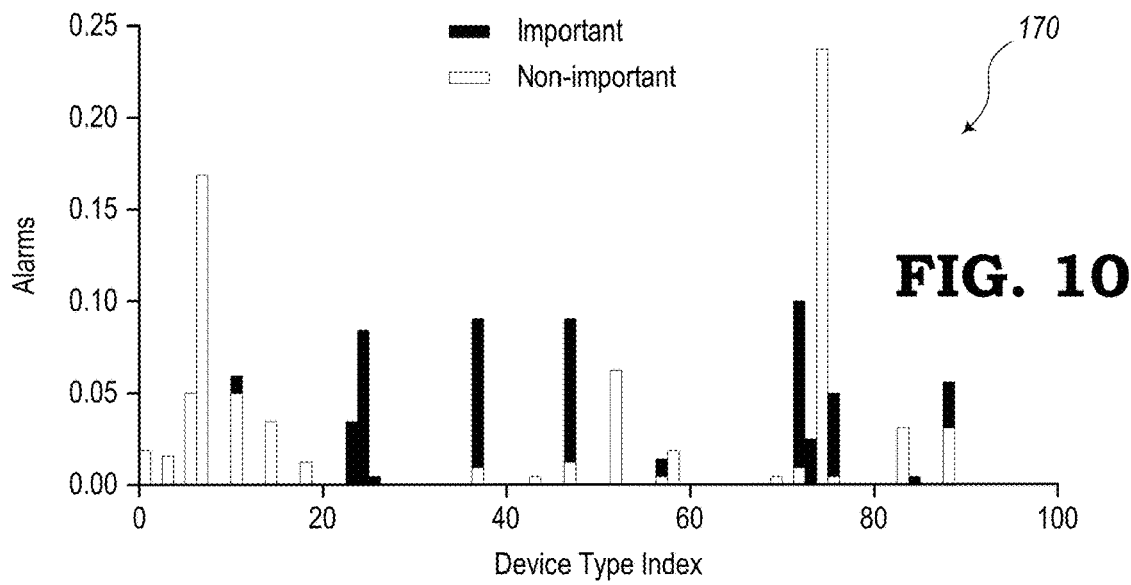
FIG. 10 is a graph showing assurance and analytics processes of an example software for analyzing a network, according to various embodiments.

FIG. 10 is a graph 170 showing assurance and analytics processes of an example software for analyzing a network. The results show important alarm characteristics and non-important alarm characteristics over device type index. The example software may be configured to operate with respect to a network to determine possible actions that may be taken to optimize the operations of the network. For example, some recommended actions may include a) re-provisioning un-protected services after a Loss of Signal (LoS), b) re-routing services based on utilization, c) auto-scaling VNFs, d) modifying BGP routes, among other.

There may be several reasons why actions may be recommended for the packet/optical network 160. Some triggers for making action recommendations may include the detection of a) a variety of network assurance scenarios, b) a self-optimizing network, among other.

Figure 11:
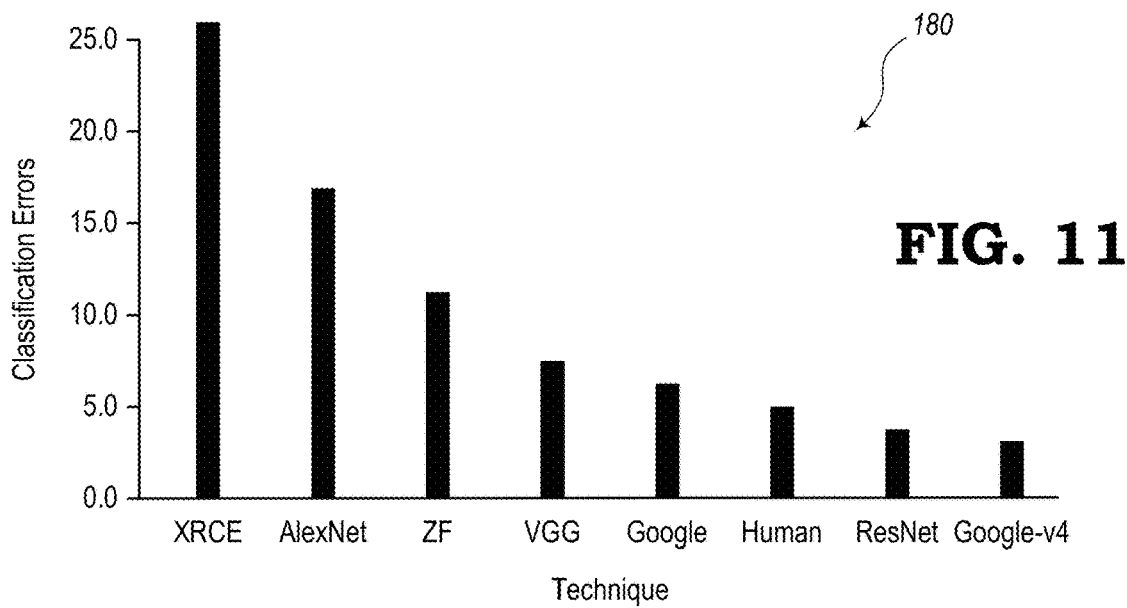
FIG. 11 is a graph showing classification errors for various supervised ML techniques developed over time, according to various embodiments.

FIG. 11 is a graph 180 showing classification errors for various supervised ML techniques developed over time. The supervised ML techniques are configured to learn from examples and may be used for computer vision, natural language, etc. A first algorithm (i.e., XRCE), developed in 2011, shows a classification error of 26.0. Other examples of various techniques include AlexNet (2012), ZF (2013), VGG (2014), GoogleNet (2014), human-based process, ResNet (2015), and GoogleNet (version 4) (2016). The technique or algorithm with the fewest classification errors, as shown in this graph 180, is the GoogleNet-v4 with 3.1 classification errors.

Figure 12:
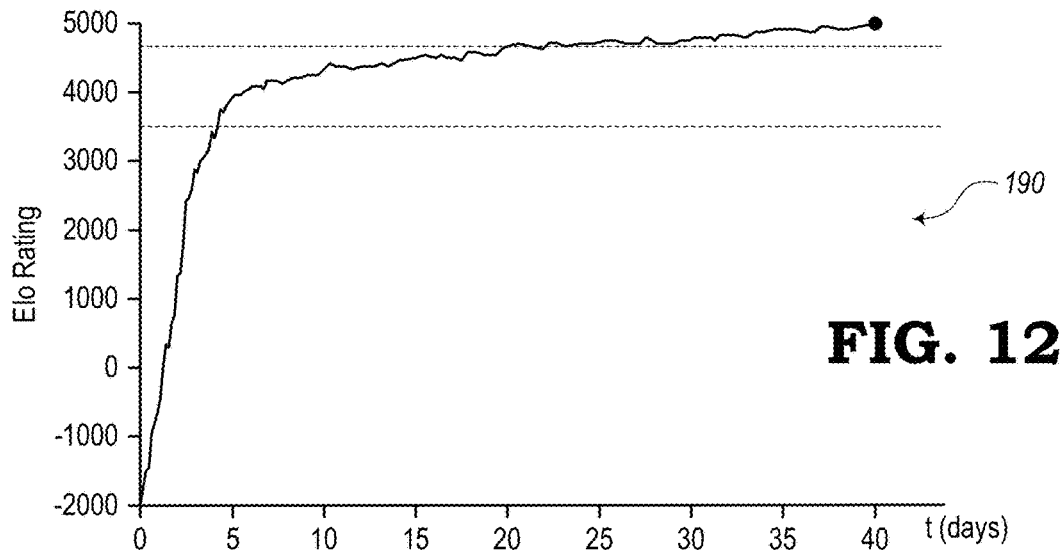
FIG. 12 is a graph showing an Elo rating versus time for an example technique using RL, according to various embodiments.

FIG. 12 is a graph 190 showing an EIo rating versus time (days) for an example technique using Reinforcement Learning (RL). For example, RL may be useful in the field of games, self-driving cars, or other environments where it is possible to learn by trial and error. In the graph 190, an example process (i.e., AlphaGo Zero) is analyzed over the course of 40 days in the environment of playing the strategic game known as Go. It was determined that this process surpasses other versions of AlphaGo and may be the best Go player in the world. It is configured to learn entirely from self-play with no human intervention and using no historical data.

Raw Unprocessed Input Data

Raw data can be obtained from any suitable measuring device in communication with the network of interest. Raw data may be defined as parameters or metrics obtained directly without any processing involved. One of the goals of the ARE is to recommend appropriate remedial actions in reaction to problematic situations (or "context"). In the environment of ML, detection is made of the conditions of the network and/or actions taken to adjust or change the network or network elements. The captured data may include an indication of concrete field data that can be used for training and testing ARE.

Referring again to FIG. 7, the NOC 134 and/or AI 136 of the ARE system 130 are configured to learn how to associate incoming raw data (e.g., "context data") with remedial actions 138 to correct any problematic conditions of the multi-vendor network 132. The context data may include alarms, PM data, etc., which may be related to device performance, Quality of Service (QoS), Quality of Experience (QoE), or other metrics. The "action" data can be collected from one or more of shelf processor logs (e.g., in an optical line system), command logs (multi-vendor), an NMS database, NOC tickets, etc. Action data may be collected by custom software. Normally, conventional systems do not access this data from shelf processor logs and command logs. Therefore, using these sources of action data for an ARE system is considered to be new in the field. Collecting such action data can be done automatically in the field with resource adapting software products that connect to each network element (NE), execute a Retrieve Log process on each NE, and parse each log file.

Simulation

Figure 13:
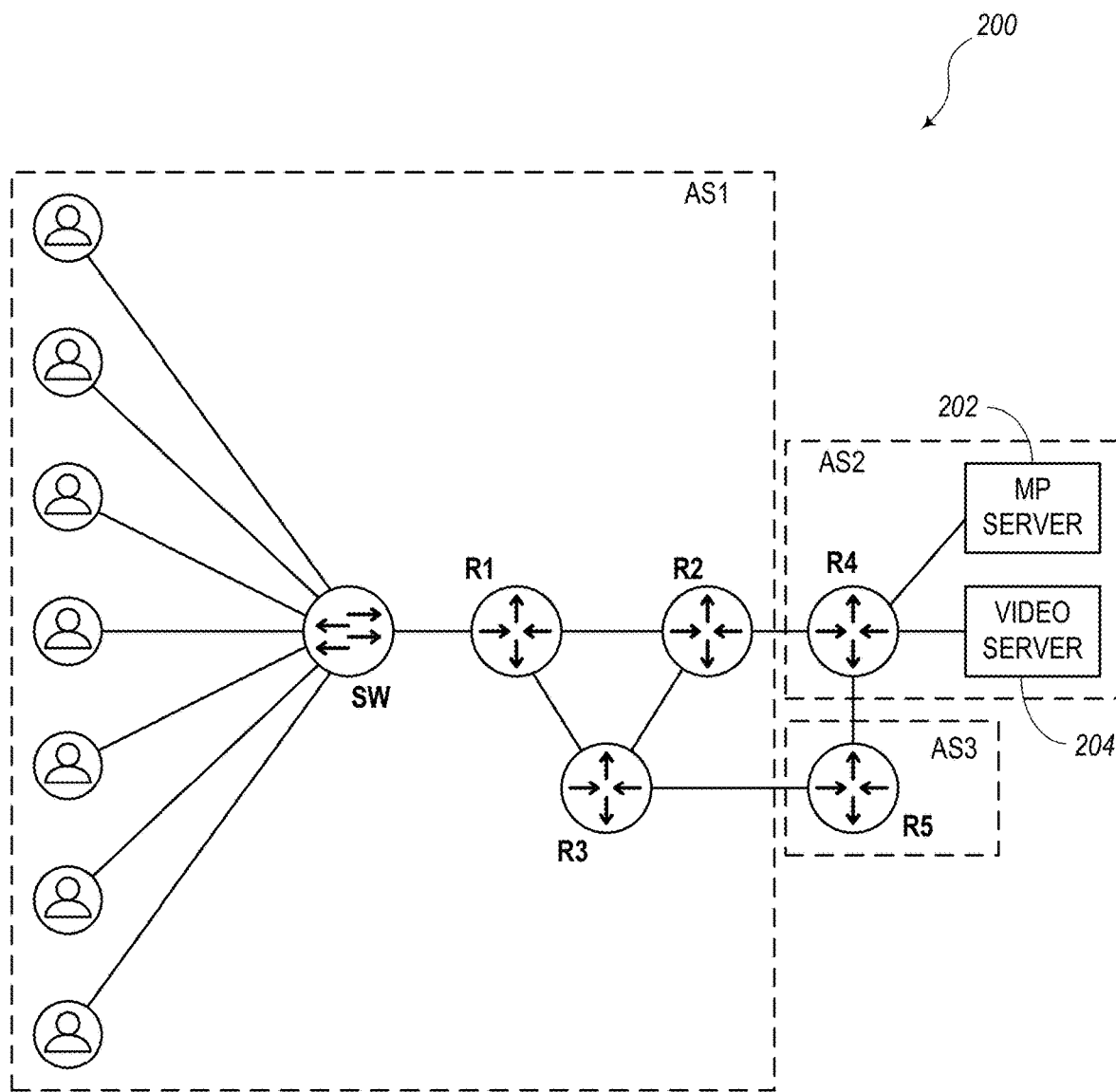
FIG. 13 is a diagram illustrating a prototype of a simulation network, according to various embodiments.

FIG. 13 is a diagram illustrating an embodiment of a prototype of a simulation network 200 includes a first Autonomous System (AS1), a second Autonomous System (AS2), and a third Autonomous System (AS3). The AS1 includes routers R1, R2, and R3 and a switch SW connected to a plurality of end user devices. The AS2 includes an MP server 202, a video server 204, and a router R4. The AS3 includes another router R5. In this embodiment, four paths are considered for providing content from the servers 202, 204 of the AS2 to the end users via SW. Particularly, various paths may be routed from R4 to R1. A first path (Path 1) proceeds from R4 to R2 to R1. A second path (Path 2) proceeds from R4 to R2 to R3 to R1. A third path (Path 3) proceeds from R4 to R5 to R3 to R1. A fourth path (Path 4) proceeds from R4 to R5 to R3 to R2 to R1.

To demonstrate the feasibility of action recommendation processes, the simulation network 200 can be developed as a prototype. In this embodiment, the simulation network 200 was designed to be simple but not trivial. It includes five IP routers R1-R5, three (or four) IP/MPLS tunnels connecting a varying number of clients (end users) in AS1 to the MP server (202), video server 204, and/or other servers (e.g., FTP servers) in AS2. Using custom software, the number of clients or end users can change over time, which can create traffic on the network and occasionally create congestion. Another aspect of the simulation network 200 is that issues of routers R1-R5 can be randomly introduced.

To mimic NOC actions, the simulation network 200 can be configured to implement five "expert rules," which may be based on common sense and may include:

1. if congestion, re-route internally if possible;
2. else-if congestion, re-route externally (AS3);
3. else-if router issue, fix router (e.g., reboot);
4. else-if traffic on Path 3 (R4-R5-R3-R1), re-route internally if non-congested; and
5. else do nothing.

Consequently, twelve actions were possible in the simulation network 200, including, for example, re-routing flows among three (or four) paths, rebooting AS1 routers, waiting (e.g., do nothing). Then, the simulation network 200, including NOC and end-users, can run by itself for long periods of time, collecting PM data periodically (e.g., every 30 seconds) and giving an opportunity to take an action periodically (e.g., every minute). In this way, context data and action data can be generated. As described below, the simulated network 200 can be leveraged to prove three different ML methods. With all three methods, it is shown that ARE can be trained solely from raw context and action data.

Method 1: Stateless Supervised ML

Supervised Machine Learning (SL) can be used to reproduce the NOC action logic. In related U.S. patent application Ser. No. 16/892,594 (mentioned above), NOC action can be reproduced using a two-step process: 1) determining the network "state" from context data, and 2) determining the recommended action from network "state." The present disclosure is able to demonstrate that the same thing can be done in one step, going straight from context data to a recommended action. For example, this may be done with deep learning algorithms where a representation of the network state is learned by hidden layers.

FIG. 14 is a table showing a confusion matrix 210 for a fully-connected Neural Network (NN) having 66 input features, two hidden layers of 128 neurons (e.g., Rectified Linear Unit (ReLU) activation), and 12 output neurons (e.g., SoftMax function activation). The labels in the confusion matrix 210 correspond to "actions." In this embodiment, the NN was trained and tested with 55,000 samples collected over 19 days in the lab. Even with a relatively shallow NN, it was possible to predict what action would have been executed by NOC (i.e., a "true label") given context data.

Figure 15:
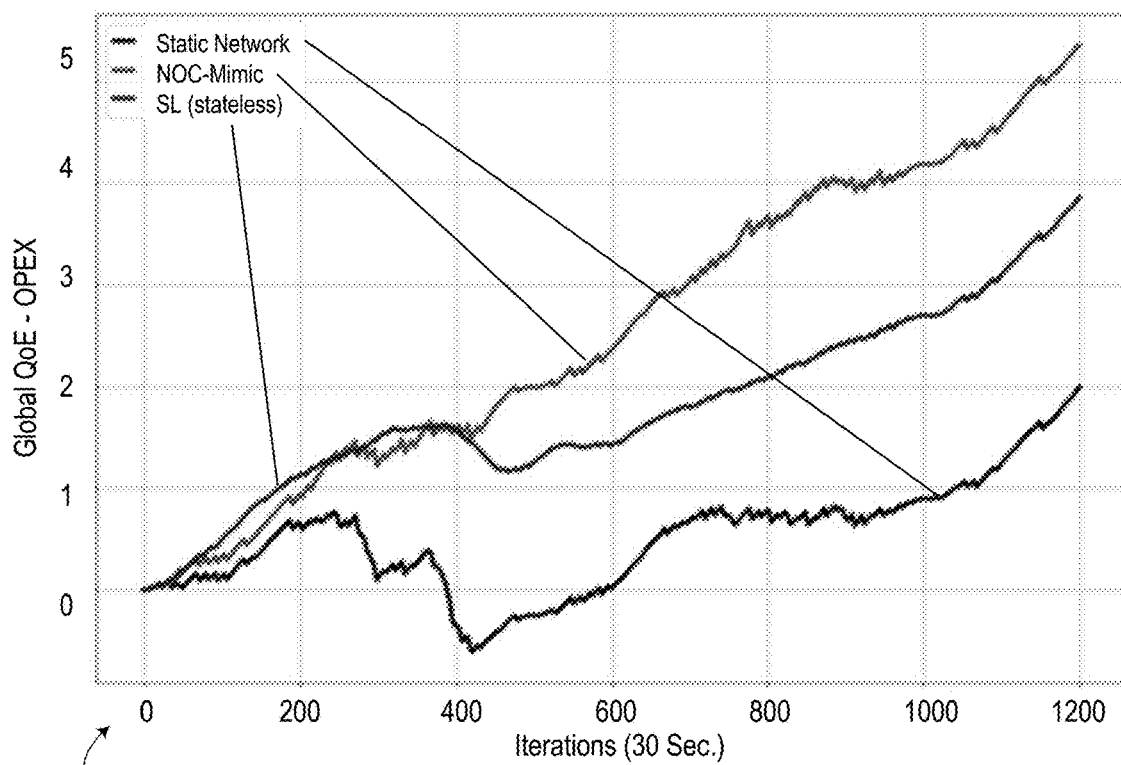
FIG. 15 is a graph showing the difference between Quality of Experience (QoE) and operating expenses (OPEX) for a static network, a NOC mimicked network, and a supervised ML stateless network, according to various embodiments.

FIG. 15 is a graph 220 showing the difference between QoE and operating expenses (OPEX) (i.e., QoE-OPEX) for a static network, a NOC mimicked network, and a supervised ML stateless network where iterations are taken every 30 seconds. When using the confusion matrix 210 of FIG. 14 in an ARE environment and executing recommended actions automatically, the graph 220 shows that much better results were achieved than a static network, albeit without reproducing NOC rules completely at this point. The graph 220 may be shown to prove that SL stateless ARE is able to learn something useful, and strongly suggests that it could fully reproduce NOC accuracy with more optimization work.

In FIG. 15, the graph 220 includes time on the x-axis and the difference QoE-OPEX on the y-axis. The QoE represents the mean Quality of Experience from all network end-users (i.e., the higher, the better) minus the operational cost (OPEX) of running the network (i.e., the lower, the better), where this difference is summed over time.

ARE with Reinforcement Learning

It should be possible to outperform NOC rules by using Reinforcement Learning (RL) algorithms in ARE. Indeed, SL may be configured to simply copy NOC actions, but RL also evaluates their effectiveness and can even discover new rules. Instead of labeling the context data, as before, it may be possible to capture the NOC end goals in an appropriate "reward" function that ARE will learn to maximize.

In this case, it is possible to use QoE-OPEX as the "reward," which may be an effective metric for capturing the end goals of the NOC actions. That being said, for telecommunications applications, it should be noted that the network should normally remain up and running at all times. However, this can be problematic with naïve RL by trial and error. As discussed below, two RL methods can be used by ARE with no risk of crashing the network.

Method 2: RL with Pre-Training from NOC Followed by Prudent Exploration

The ML process in this case may exploit the concept of offline RL (aka "batch" RL). This may include a process of traversing historical time-series where the context and action data is already pre-collected, computing the reward after each historical action, and updating the learning algorithm accordingly. Hence, offline RL can learn about the effectiveness of actions even if the decision to take these actions was not taken by an RL agent.

With this second method, RL training may include the following three steps. The first step (Step 1) may include pre-training with historical data from the target network. The historical action data may come from NOC decisions in this case. The second step (Step 2) may include deploying an RL agent (e.g., an ARE device) with only exploitation (and no exploration) and confirming its behavior in a production environment. In this case, it is expected that the NOC effectiveness can be reproduced. The third step (Step 3) includes "prudently" allowing a small amount RL exploration in order to learn new and better action policies. It is expected that this step will eventually outperform NOC effectiveness.

After Step 1, it has been noted that ARE recommendations can be leveraged for manual actions, although it is not mandatory to deploy ARE in a live environment. After Step 2, it has been noted that pure offline RL with zero exploration is effectively similar to supervised ML, though it is implemented differently.

Figure 16:
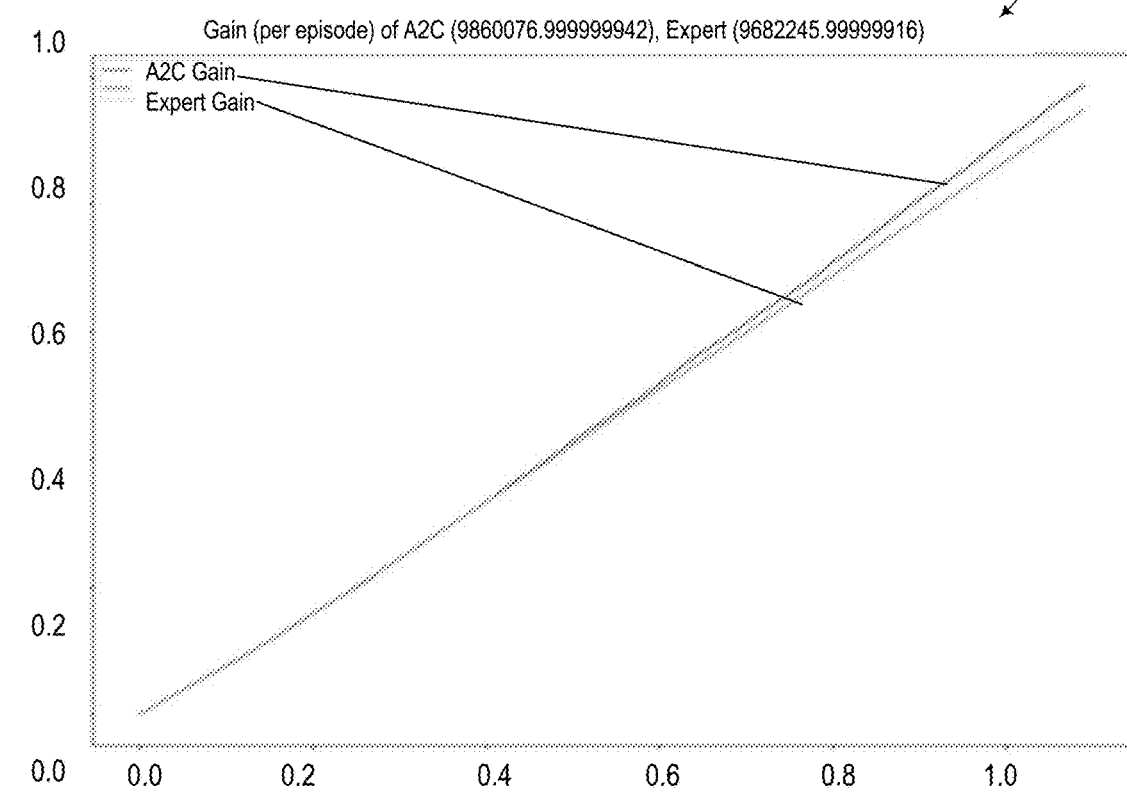
FIG. 16 is a graph 230 showing gain over time for two different systems, according to various embodiments.

FIG. 16 is a graph 230 showing gain over time for two different systems. Essentially, the graph 230 shows the results of Step 2 and Step 3 described above. The x-axis represents time and the y-axis represents the factor QoE–OPEX being summed over time. The lower curve represents the NOC or expert curve and the curve with the slightly higher gain is an RL technique (e.g., A2C). After offline pre-training, the first 400k steps have zero exploration and correspond to Step 2 above. As expected, the RL technique achieves similar effectiveness as NOC during this time. Then steps 400k to 1.1M in the graph 230 show that small, but non-zero, exploration is conducted (e.g., corresponding to Step 3 above). As expected, the RL progressively outperforms the NOC and never falls behind NOC during this time. It may be noted that the graph 230 was produced with a simulator for simplicity and that similar results may be obtained by solely implementing a real network in production without a simulator.

Method 3: RL with Simulator and Transferring Learning to Real Network

Alternative to Method 2, the present disclosure may utilize another method to train RL with a network simulator. Then, the learned results obtained from the simulation can be transferred to a real network. Therefore, this method may include the following two steps:

training RL agents with non-zero exploration from the beginning in a simulated environment; and transferring the pre-trained RL from the simulator environment to a real network, validating that the ARE performance is as expected, and then using this in production.

After the first step of training the RL agents, it was noted that ARE recommendations can be leveraged for manual actions, although it is not mandatory to deploy ARE in a live environment.

Compared to Method 2, Method 3 may include one or more advantages since simulated data can be produced in virtually unlimited amounts, while historical data from real networks has a finite amount and can be expensive to collect. However, Method 2 may include one or more advantages since Method 3 relies on a good simulator, which may be difficult to develop, and since Method 3 is configured to transfer results from a simulator to real network and thus may be sensitive to simulation defects. Also, the learning associated with Method 2 may occur from the real network natively.

Figure 17:
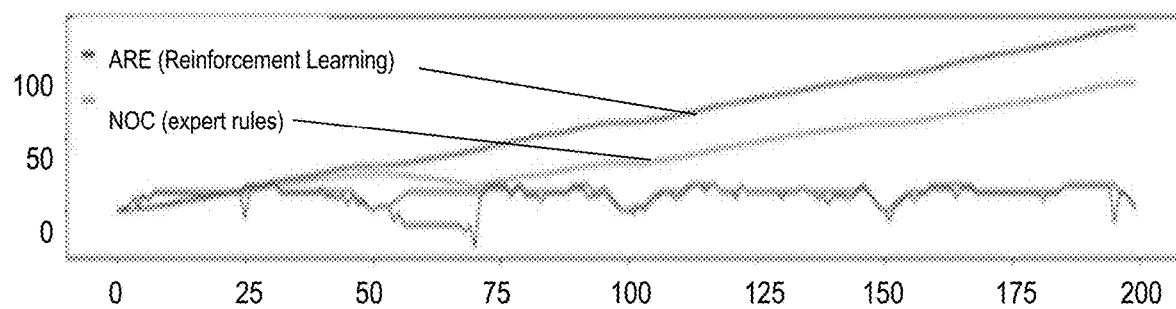
FIGS. 17-20 show graphs of results of various prototypes illustrating the effectiveness of ARE on a real network, according to various embodiments.
Figure 18:
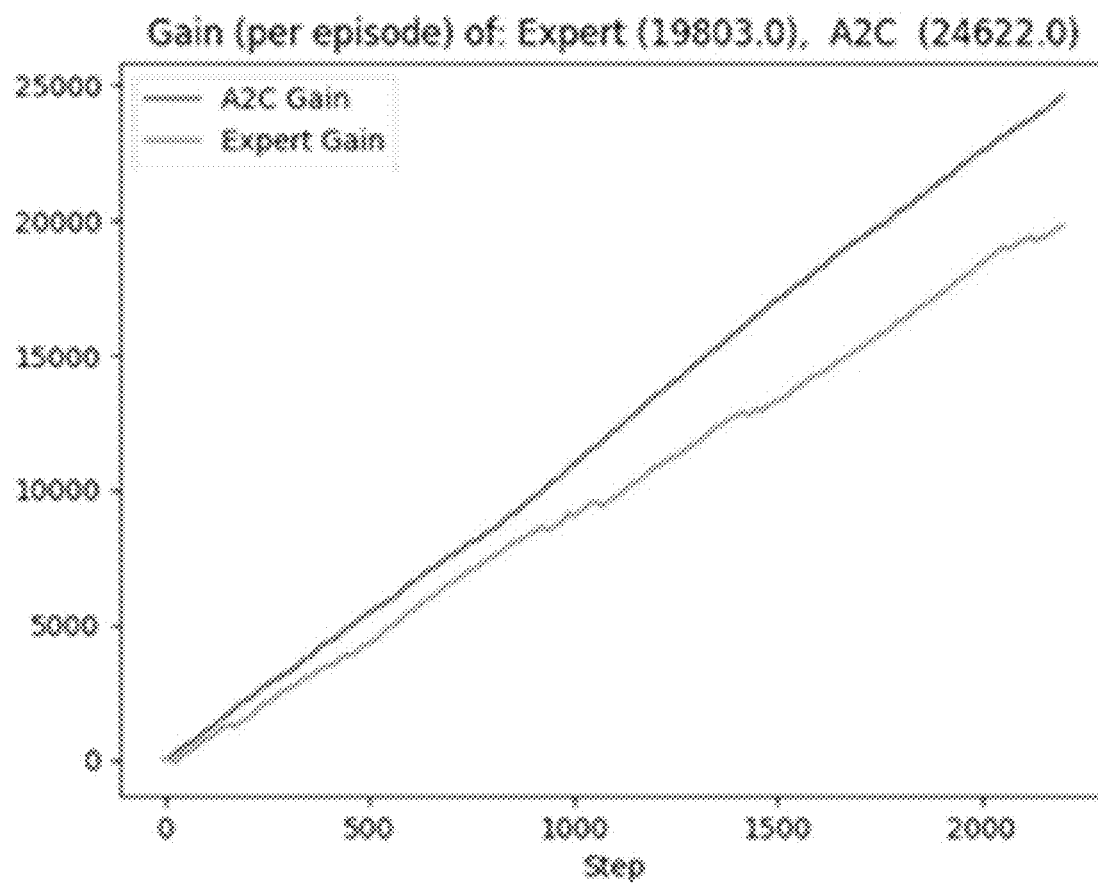
Figure 19:
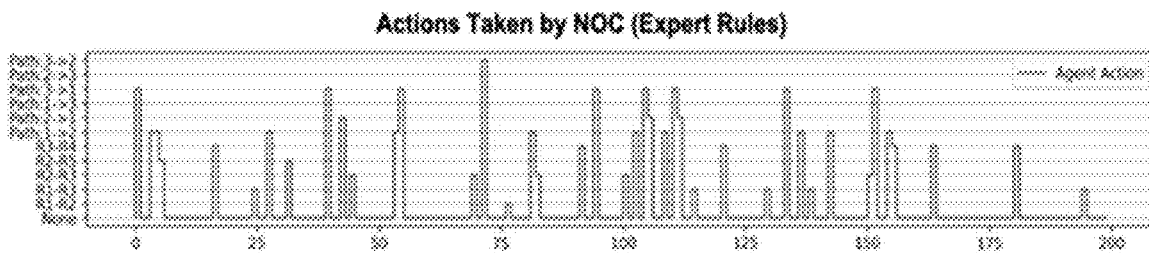
Figure 19:
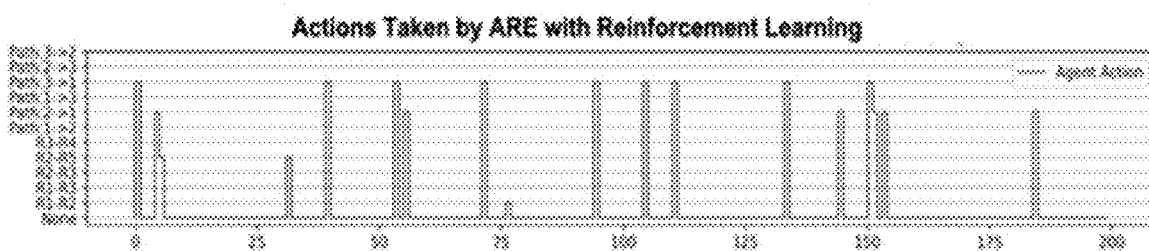
Figure 20:
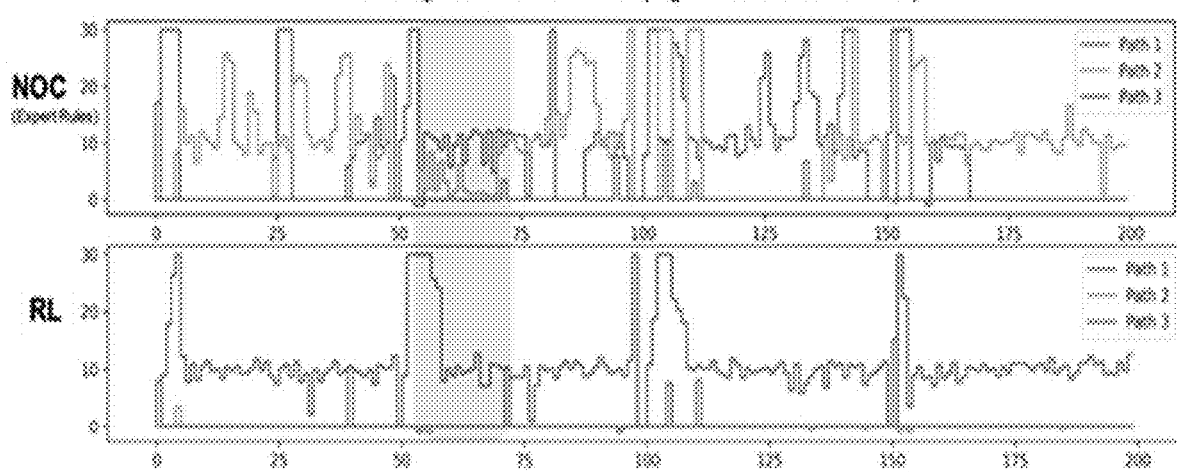

FIGS. 17-20 show prototype results obtained with Method 3. FIGS. 17 and 18 show graphs 240, 250, which illustrate the effectiveness of ARE on a real network after pre-training from a simulator. As before, x-axis is time and y-axis is QoE–OPEX summed over time. In both graphs 240, 250, it can be seen that ARE outperforms NOC from the beginning and never falls behind. FIGS. 19 and 20 examine raw context data to gain some intuition about why ARE outperforms NOC. FIGS. 19 and 20 show graphs 260, 270, which illustrate raw context data during the time period covered by FIG. 17. In FIG. 19, the graph 260 shows that ARE achieves more stable operations. In FIG. 20, graph 270 shows that ARE delivers QoE to end-users. Essentially, it seems in this case that RL has learned that it is better to pack all traffic on Path 1 shown in the simulation network 200 of FIG. 13 as much possible, instead of load-balancing between Path 1 and Path 2.

Determination of Best RL Architecture and Hyper-Parameters

Figures 21, 22:
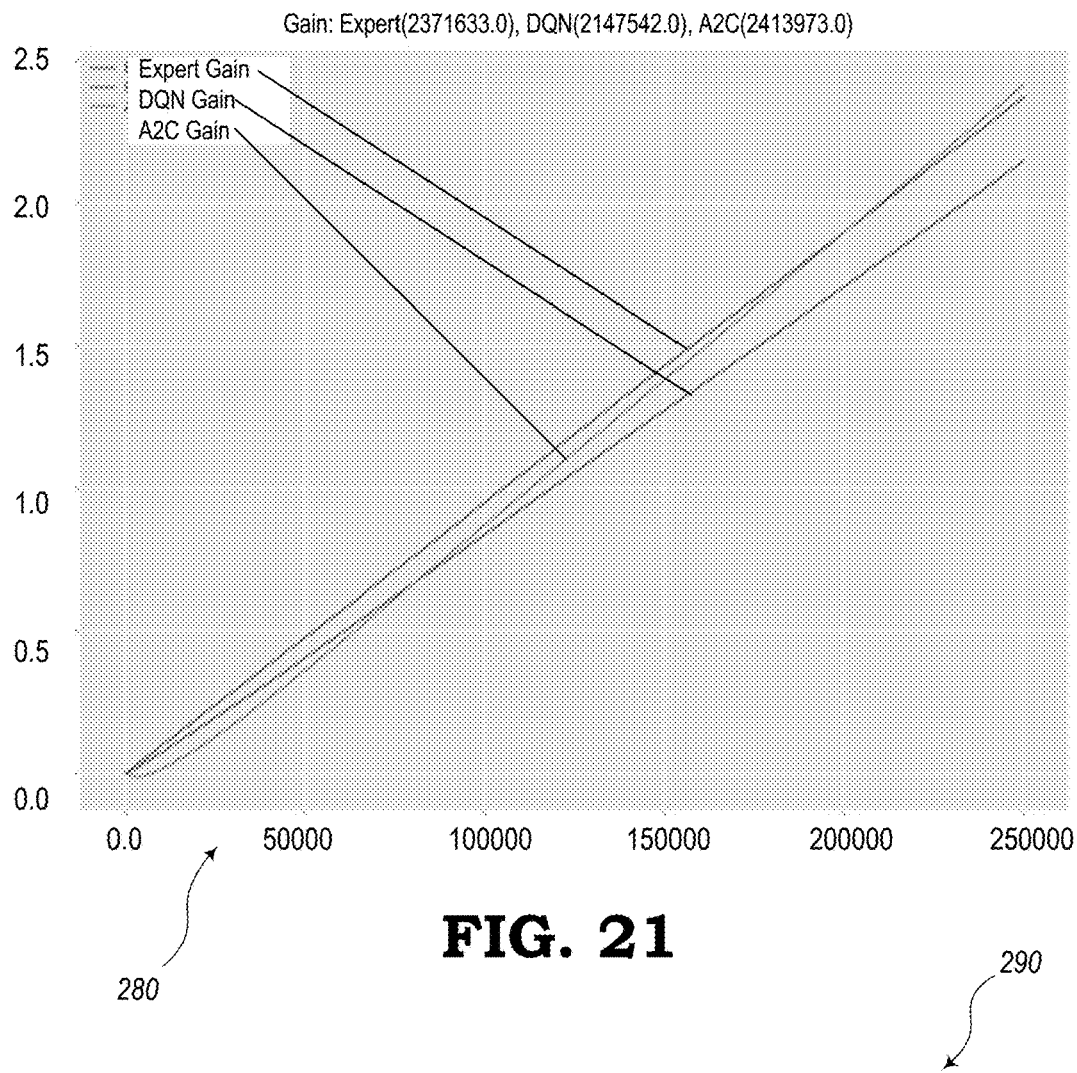
FIG. 21 is a graph showing results of using the ML process, according to various embodiments.
FIG. 22 is table that focuses on an A2C architecture, according to various embodiments.

FIG. 21 is a graph 280 showing results of using the ML process of Method 3. In graph 280, the results of the tested prototype are shown two RL architectures: 1) a "double DQN" and 2) an "Actor-Critics (A2C)." The graph 280 of FIG. 21 shows that A2C architecture achieves better performance. A2C surpasses double DQN at around 80,000 steps and surpasses human NOC at around 230,000 steps.

FIG. 22 is table 290 that focuses on the A2C architecture. In this case, the hyper-parameters for the algorithms have been optimized. The table 290 shows that better results were obtained with deeper value NN (e.g., V-Net) and simpler policy NN (e.g., Pi-Net). For example, this table 290 illustrates how ML models could be optimized when ARE will be productized. Generally speaking, the prototype proves the feasibility of ARE concepts in practice.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, enable a processing device to:
   receive raw, unprocessed data obtained directly from one or more network elements of a network, and
   determine one or more remedial actions using a direct association between the raw, unprocessed data and the one or more remedial actions, wherein the direct association is based on offline Reinforcement Learning (RL) that analyzed one or more of historical Network Operations Center (NOC) actions and operations on a network simulator.

2. The non-transitory computer-readable medium of claim 1, wherein determining the one or more remedial actions is performed without determining a state of the one or more network elements.

3. The non-transitory computer-readable medium of claim 1, wherein determining the one or more remedial actions includes utilizing an Action Recommendation Engine (ARE).

4. The non-transitory computer-readable medium of claim 3, wherein the instructions further enable the processing device to:
receive a recommendation from the ARE regarding how, when, and where the one or more remedial actions are to be conducted on the network, and
leverage the recommendation to enable manual execution of the one or more remedial actions in the network.

5. The non-transitory computer-readable medium of claim 3, wherein the instructions further enable the processing device to utilize the ARE to predict actions executed by a Network Operations Center (NOC) based on the raw, unprocessed data.

6. The non-transitory computer-readable medium of claim 1, wherein the offline RL that analyzed the historical NOC actions includes evaluations of historical NOC actions not taken via exploration.

7. The non-transitory computer-readable medium of claim 6, wherein the exploration includes
traversing historical time-series where context and action data is already pre-collected, computing the reward after each historical action, and updating the offline RL accordingly.

8. The non-transitory computer-readable medium of claim 1, wherein the offline RL that analyzed operations on the network simulator includes validation of the learned direct association on a real network prior to use in production.

9. The non-transitory computer-readable medium of claim 1, wherein the raw, unprocessed data is un-labeled and a state of the network is unknown.

10. The non-transitory computer-readable medium of claim 1, wherein the raw, unprocessed data includes one or more of Performance Monitoring (PM) data, margin information, alarms, Quality of Service (QoS) information, Quality of Experience (QoE) information, configuration information, fiber cut information, and fault information.

11. The non-transitory computer-readable medium of claim 1, wherein the one or more remedial actions include one or more of adjusting launch power at an amplifier, adjusting channel power at a Wavelength Selective Switch (WSS), adjusting a modulation scheme at an optical receiver, rebooting a card, cleaning or repairing a fiber, utilizing a protection path, adding bandwidth, defragmenting wavelengths across the network, running an Optical Time Domain Reflectometry (OTDR) trace, re-provisioning unprotected services after a loss of signal, adjusting Open Shortest Path First (OSPF) costs, re-routing Internet Protocol (IP) and Multi-Protocol Label Switching (MPLS) tunnels, modifying Border Gateway Protocol (BGP) routes, re-routing services based on utilization, auto-scaling Virtual Network Functions (VNFs), adjusting alarm thresholds, adjusting timer thresholds, clearing upstream alarms, fixing inventory, and upgrading software.

12. The non-transitory computer-readable medium of claim 1, wherein the instructions further enable the processing device to collect data related to remedial actions conducted on the network, the data related to remedial actions being collected from one or more of shelf processor logs, command logs, a Network Management System (NMS) database, and Network Operations Center (NOC) tickets.

13. The non-transitory computer-readable medium of claim 1, wherein the instructions further enable the processing device to learn a representation of a network state by observing hidden layers.

14. The non-transitory computer-readable medium of claim 1, wherein the network is modeled in a simulated network environment.

15. The non-transitory computer-readable medium of claim 14, wherein the instructions further enable the processing device to utilize a Reinforcement Learning (RL) technique to determine the one or more remedial actions of the simulated network environment and transfer the one or more remedial actions to an actual network.

16. The non-transitory computer-readable medium of claim 15, wherein the instructions further enable the processing device to:
train RL agents with initial non-zero exploration in the simulated network environment, and
transfer pre-trained RL results from the simulated network environment to the actual network.

17. A system comprising:
one or more processing devices; and
a memory device configured to store computer logic having instructions that, when executed, enable the one or more processing devices to
receive raw, unprocessed data obtained directly from one or more network elements of a network, and
determine one or more remedial actions using a direct association between the raw, unprocessed data and the one or more remedial actions, wherein the direct association is based on offline Reinforcement Learning (RL) that analyzed one or more of historical Network Operations Center (NOC) actions and operations on a network simulator.

18. The system of claim 17, wherein the instructions further enable the one or more processing devices to utilize Machine Learning (ML) to reproduce actions of a Network Operations Center (NOC) in communication with the network.

19. A method comprising the steps of:
receiving raw, unprocessed data obtained directly from one or more network elements of a network; and
determining one or more remedial actions using a direct association between the raw, unprocessed data and the one or more remedial actions, wherein the direct association is based on offline Reinforcement Learning (RL) that analyzed one or more of historical Network Operations Center (NOC) actions and operations on a network simulator.

20. The method of claim 19, wherein the step of determining the one or more remedial actions includes utilizing an Action Recommendation Engine (ARE).

* * * * *